(12) United States Patent
Li et al.

(10) Patent No.: US 8,406,282 B2
(45) Date of Patent: Mar. 26, 2013

(54) MULTIPLEXING STRIP AND DATA CHANNELS IN A TIME DIVISION DUPLEX COMMUNICATION SYSTEM

(75) Inventors: Junyi Li, Bedminster, NJ (US); Arnab Das, Summit, NJ (US); Rajiv Laroia, Far Hills, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 665 days.

(21) Appl. No.: 11/857,750

(22) Filed: Sep. 19, 2007

(65) Prior Publication Data

US 2008/0130479 A1 Jun. 5, 2008

Related U.S. Application Data

(60) Provisional application No. 60/845,937, filed on Sep. 19, 2006.

(51) Int. Cl.
*H04J 11/00* (2006.01)
(52) U.S. Cl. ........................ 375/203
(58) Field of Classification Search ............... 370/203
See application file for complete search history.

(56) References Cited

U.S. PATENT DOCUMENTS

| | | | | |
|---|---|---|---|---|
| 5,537,434 A | * | 7/1996 | Persson et al. | 375/134 |
| 7,092,353 B2 | * | 8/2006 | Laroia et al. | 370/210 |
| 2004/0054774 A1 | * | 3/2004 | Barber et al. | 709/224 |
| 2004/0179627 A1 | * | 9/2004 | Ketchum et al. | 375/267 |
| 2005/0085265 A1 | * | 4/2005 | Laroia et al. | 455/560 |
| 2005/0135517 A1 | * | 6/2005 | Coffey et al. | 375/347 |
| 2006/0029011 A1 | | 2/2006 | Etemad et al. | |

FOREIGN PATENT DOCUMENTS

| | | |
|---|---|---|
| WO | 2005038606 | 4/2005 |
| WO | 2005039094 | 4/2005 |
| WO | 2005041448 | 5/2005 |
| WO | WO 2005/041448 * | 5/2005 |

OTHER PUBLICATIONS

International Search Report—PCT/US07/078944, International Search Authority—European Patent Office—Apr. 23, 2008.
Written Opinion—PCT/US07/078944, International Search Authority—European Patent Office—Apr. 23, 2008.
Taiwan Search Report—TW096134943—TIPO—Feb. 4, 2012.

* cited by examiner

*Primary Examiner* — Mark Rinehart
*Assistant Examiner* — Maharishi Khirodhar
(74) *Attorney, Agent, or Firm* — Sam Talpalatsky; Nicholas J. Pauley; Jonathan T. Velasco

(57) ABSTRACT

Systems and methodologies are described that facilitate generating and/or analyzing downlink transmission units in OFDM TDD environments. Strip OFDM symbols may be selectively inserted within downlink transmission units; for example, the position of strip OFDM symbols may vary from cell to cell. Further, the position may be a function of a characteristic of a cell (e.g., cell identifier) and/or an expected drift. Moreover, a strip OFDM symbol may be interjected at a location in a downlink transmission unit so as to mitigate alignment with disparate strip OFDM symbols in downlink transmission units associated with differing cells.

24 Claims, 16 Drawing Sheets

MULTIPLEXING STRIP AND DATA CHANNELS IN A TIME DIVISION DUPLEX COMMUNICATION SYSTEM

CROSS-REFERENCE TO RELATED APPLICATIONS

This application claims the benefit of U.S. Provisional Patent application Ser. No. 60/845,937 entitled "TIME DIVISION DUPLEX COMMUNICATIONS" which was filed Sep. 19, 2006. The entirety of the aforementioned application is herein incorporated by reference.

BACKGROUND

I. Field

The following description relates generally to wireless communications, and more particularly to selectively inserting strip symbols in downlink transmission units in a wireless communication system.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a wireless terminal. A wireless terminal within the coverage area of such base station can be employed to receive one, more than one, or all the data streams carried by the composite stream. Likewise, a wireless terminal can transmit data to the base station or another wireless terminal.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

In a time division duplex (TDD) system, the air interface resource may be used alternately as downlink and uplink transmission units with guard time intervals being added in-between. A downlink transmission unit represents a time interval in which the downlink signal is sent, and an uplink transmission unit represents a time interval in which the uplink signal is sent. In the TDD system, the downlink and uplink transmission units are interleaved with each other. When a TDD system is deployed in a cellular environment, the downlink and uplink transmission units of base stations may be synchronized; accordingly, when one base station is in downlink transmission other base stations may also be in downlink transmission, and when one base station is in uplink transmission other base stations may also be in uplink transmission. Since downlink transmission units from disparate base stations may be synchronized, control data such as beacons and the like may be simultaneously transmitted by each of the disparate base stations; thus, a mobile device may encounter difficulty associated with discerning control data provided from differing base stations at common times.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection facilitating generation and/or analysis of downlink transmission units in OFDM TDD environments. A downlink transmission unit includes a number of non-strip OFDM symbols, and may furthermore include one or multiple strip OFDM symbols. While the non-strip OFDM symbols are used to transmit data and control signals, the strip OFDM symbols are mainly used to transmit control signals (e.g., broadcast control signals). A tone hopping scheme is used in the non-strip OFDM symbols to average inter-cell interference and achieve frequency diversity. The tone hopping scheme is not used in the strip OFDM symbols. The operation of coding and modulation in the strip OFDM symbols is done independently of that in the non-strip OFDM symbols. Different types of transmission units are used. A first type of transmission unit includes only non-strip OFDM symbols. A second type of transmission unit is constructed by adding strip OFDM symbols to the first type, in which case the second type of transmission unit has the same number of non-strip OFDM symbols as the first type transmission unit and the tone hopping scheme used in the non-strip symbols of the first and the second type transmission units is the same. Strip OFDM symbols may be selectively inserted within the second type downlink transmission units; for example, the position of strip OFDM symbols may vary from cell to cell. Further, the position may be a function of a characteristic of a cell (e.g., cell identifier) and/or an expected drift. Moreover, a strip OFDM symbol may be interjected at a location in a downlink transmission unit so as to mitigate alignment with disparate strip OFDM symbols in downlink transmission units associated with differing cells.

According to related aspects, a method that facilitates generating downlink transmission units within a time division duplex (TDD) environment is described herein. The method may include selectively positioning a strip Orthogonal Frequency Division Multiplexing (OFDM) symbol within a downlink transmission unit based upon a characteristic of a cell. Further, the method may comprise transmitting the downlink transmission unit.

Another aspect relates to a wireless communications apparatus. The wireless communications apparatus may include a memory that retains instructions related to selectively inserting a strip OFDM symbol in a downlink transmission unit as a function of expected drift in a TDD system, interjecting non-strip OFDM symbols in remaining locations of the downlink transmission unit, and sending the downlink transmission unit via a downlink. Moreover, the wireless communications apparatus may include a processor, coupled to the memory, configured to execute the instructions retained in the memory.

Yet another aspect relates to a wireless communications apparatus that generates downlink transmission units in an OFDM TDD environment. The wireless communications apparatus may include means for selectively interposing a strip OFDM symbol in a downlink transmission unit to mitigate alignment with a disparate OFDM symbol between cells; and means for transferring the downlink transmission unit via a downlink.

Still another aspect relates to a machine-readable medium having stored thereon machine-executable instructions for selectively positioning a strip OFDM symbol in a downlink transmission unit that includes a plurality of non-strip OFDM symbols based on a characteristic of a cell, and transmitting the downlink transmission unit during an allotted time.

In accordance with another aspect, an apparatus in a wireless communication system may include a processor, wherein the processor may be configured to selectively position a strip OFDM symbol in a downlink transmission unit based upon a characteristic of a cell, a location of a disparate strip OFDM symbol in a differing downlink link transmission unit of a different cell, and/or an expected drift. The processor may also be configured to transfer the downlink transmission unit.

According to other aspects, a method that facilitates obtaining a downlink transmission unit in an OFDM TDD environment is described herein. The method may include receiving a downlink transmission unit from a base station associated with a cell. Moreover, the method may include analyzing a strip OFDM symbol included in the downlink transmission unit at a position corresponding to a characteristic of the cell.

Yet another aspect relates to a wireless communications apparatus that may include a memory that retains instructions for obtaining a downlink transmission unit that includes a strip OFDM symbol and a plurality of non-strip OFDM symbols, and evaluating the strip OFDM symbol selectively positioned in the downlink transmission unit to mitigate alignment with strip OFDM symbols associated with disparate cells. The wireless communications apparatus may further comprise a processor, coupled to the memory, configured to execute the instructions retained in the memory.

Another aspect relates to a wireless communications apparatus that employs a downlink transmission unit in an OFDM TDD system. The wireless communications apparatus may include means for obtaining a downlink transmission unit associated with a cell; and means for evaluating a strip OFDM symbol selectively interjected within the downlink transmission unit as a function of a cell identifier.

Still another aspect relates to a machine-readable medium having stored thereon machine-executable instructions for receiving a downlink transmission unit associated with a cell in an OFDM TDD environment, and analyzing a strip OFDM symbol selectively located within the downlink transmission unit based on a characteristic of a cell and/or an expected drift.

In accordance with another aspect, an apparatus in a wireless communication system may include a processor, wherein the processor may be configured to obtain a downlink transmission unit in a TDD system. Moreover, the processor may be configured to evaluate a strip OFDM symbol interjected at a distinctive position amongst non-strip OFDM symbols of the downlink transmission unit based on an identity of a cell.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
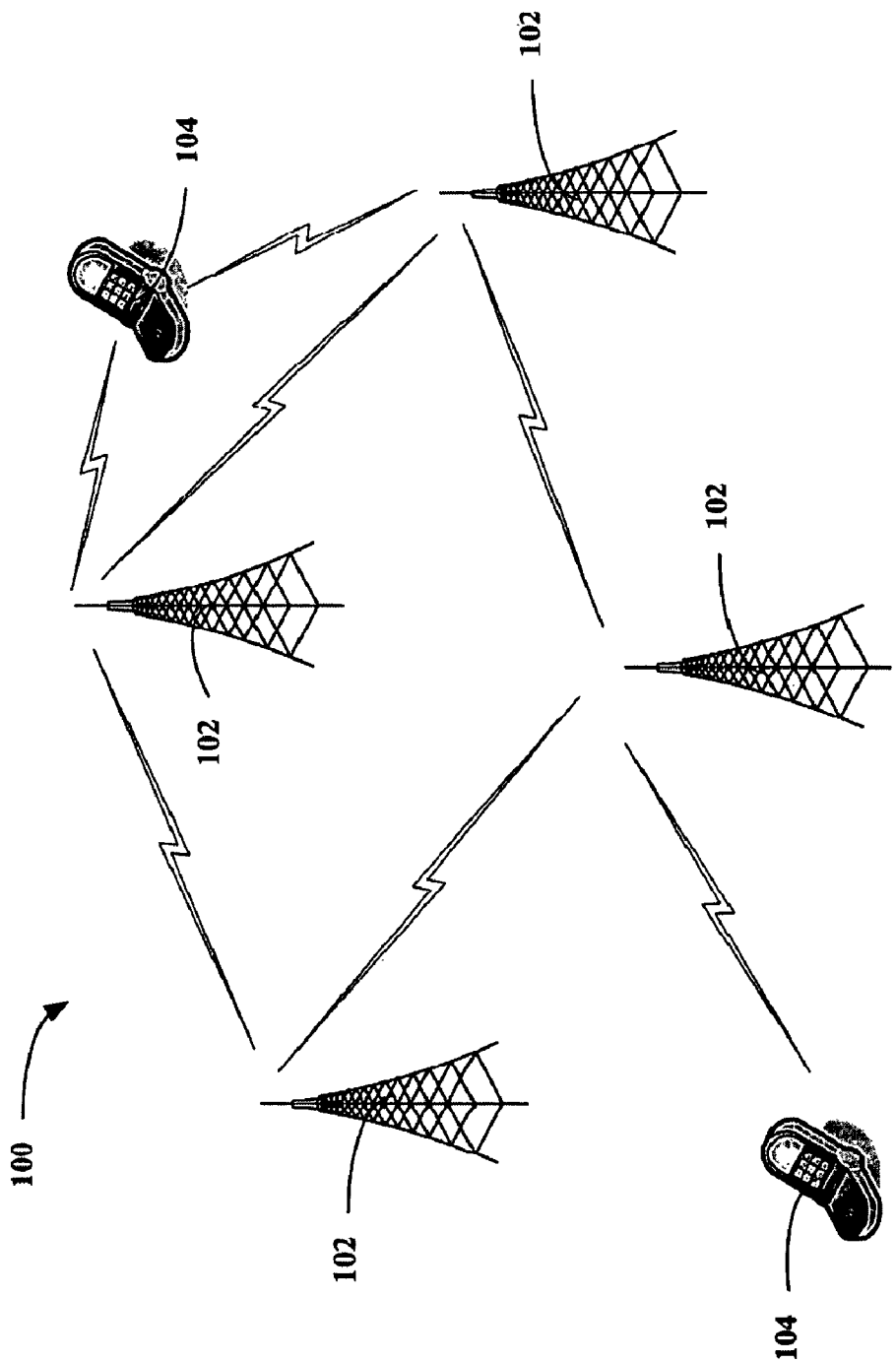
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 may comprise one or more base stations 102 (e.g., access points) in one or more sectors that receive, transmit, repeat, etc., wireless communication signals to each other and/or to one or more mobile devices 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. Mobile devices 104 can be, for example, cellular phones, smart phones, laptops, handheld communication devices, handheld computing devices, satellite radios, global positioning systems, PDAs, and/or any other suitable device for communicating over wireless communication system 100.

Base stations 102 may each communicate with one or more mobile devices 104. Base stations 102 may transmit information to mobile devices 104 over a forward link (downlink) and receive information from mobile devices 104 over a reverse link (uplink). Further, system 100 may be a time division duplex (TDD) system; thus, the forward link and the reverse link may utilize a common frequency band. In the TDD system, the downlink and uplink transmission signals alternately share the common frequency band, with guard time intervals being added in-between. A downlink transmission unit represents a time interval in which the downlink signal is sent, and an uplink transmission unit represents a time interval in which the uplink signal is sent. Moreover, system 100 may be synchronized when employing TDD such that base stations 102 receive uplink transmission units (UL TU) from mobile devices 104 during a first set of times and mobile devices 104 receive downlink transmission units (DL TU) from base stations 102 during a second set of times. According to an example, mobile devices 104 may transmit on the uplink to base stations 102 (e.g., transmit uplink transmission units), followed by a gap in time (e.g., guard time interval), and then base stations 102 may transmit on the downlink to mobile devices 104 (e.g., transmit downlink transmission units), followed by another gap in time (e.g., guard time interval), and so forth.

In accordance with an example, a downlink (or uplink) transmission unit includes any number of non-strip OFDM symbols. Further, a downlink transmission unit may include one or multiple strip OFDM symbols. Non-strip OFDM symbols are commonly utilized to transmit data and controls signals (e.g., via traffic channel(s) and/or control channel(s)). Additionally, strip OFDM symbols may be employed to transmit control signals (e.g., broadcast control signals, Beacon signals, . . . ). A tone hopping scheme may be used in connection with the non-strip OFDM symbols to average inter-cell interference and enable frequency diversity. Further, the same tone hopping scheme may not be utilized in connection with the strip OFDM symbols. Tone hopping may or may not be utilized in the strip OFDM symbols. Moreover, operation of coding and modulation in the strip OFDM symbols may be independent of that in the non-strip OFDM symbols.

Different types of transmission units are used in system 100. A first type of transmission unit includes only non-strip OFDM symbols. A second type of transmission unit is constructed by adding strip OFDM symbols to the first type. According to an example, the second type of transmission unit can have the same number of non-strip OFDM symbols as the first type of transmission unit and the tone hopping scheme used in the non-strip symbols of the first and the second type transmission units can be the same.

In a TDD system (e.g., system 100) with synchronized cells, a strip channel of one cell (e.g., associated with one of the base stations 102) may interfere with a strip channel of a disparate cell (e.g., associated with a differing one of the base stations 102), which may not be desired from an interference averaging perspective. Such interference may be mitigated by base stations 102 selectively positioning the strip OFDM symbols within downlink transmission units transferred to mobile devices 104. Further, the position of the strip OFDM symbol may vary from one cell to another (e.g., at least in a local area). For example, the position may be determined as a function of a physical layer identifier corresponding to each cell (e.g., cell identifier), which may be assigned locally unique when system 100 is deployed. Pursuant to another example, in a given cell, the position of the strip OFDM symbol within a downlink transmission unit may vary over time.

Strip OFDM symbols may be utilized to transfer Beacon signals from base stations 102 to mobile devices 104. However, each strip OFDM symbol need not carry a Beacon signal; rather, a subset of strip OFDM symbols may include Beacon signals (e.g., one out of every eight strip OFDM symbols may carry Beacon signals, . . . ). Based upon the time location of strip OFDM symbols and/or Beacon signals within downlink transmission units, mobile devices 104 may determine the identity of base stations 102 that transmitted each of the downlink transmission units.

Figure 2:
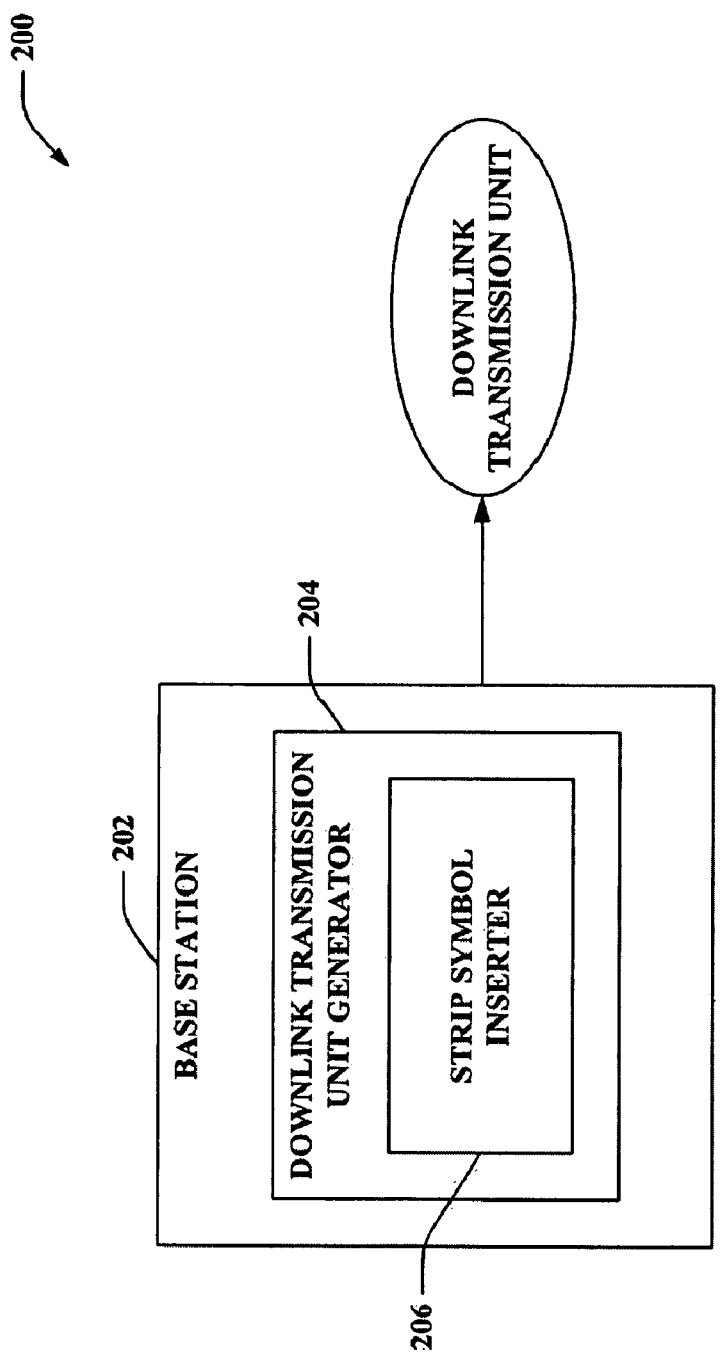
FIG. 2 is an illustration of an example wireless communications system that constructs downlink transmission units for transfer within a wireless communication environment.

Now turning to FIG. 2, illustrated is a system 200 that constructs downlink transmission units for transfer within a wireless communication environment. System 200 includes a base station 202 that further comprises a downlink transmission unit generator 204. Base station 202 may communicate with any number of mobile devices (not shown). Further, downlink transmission unit generator 204 may yield unique downlink transmission units for communication to each of the mobile devices.

Downlink transmission unit generator 204 may create distinct types of downlink transmission units. For example, downlink transmission unit generator 204 may yield a first type of downlink transmission unit (e.g., type 0 downlink transmission unit) that includes only non-strip OFDM symbols. Pursuant to an illustration, downlink transmission unit generator 204 may include N non-strip OFDM symbols in type 0 downlink transmission units, where N may be any integer. Further to this illustration, N may be 31; however, the claimed subject matter is not so limited. Additionally, downlink transmission unit generator 204 may create a second type of downlink transmission unit (e.g., type 1 downlink transmission unit) that includes non-strip OFDM symbols and one or more strip OFDM symbols. Type 1 downlink transmission units generated by downlink transmission unit generator 204 may include N non-strip OFDM symbols, where N may be any integer (e.g., N may be 31, . . . ), and M strip OFDM symbols, where M may be any integer (e.g., M may be 1, . . . ). Pursuant to an example, the number of non-strip OFDM symbols in the type 0 and type 1 transmission units can be the same. Moreover, the tone hopping scheme used in the non-strip OFDM symbols of the type 0 and type 1 transmission units can be the same. The tone hopping scheme can be symbol-by-symbol hopping in which the physical tone(s) of a logical channel hop every OFDM symbol, or block-based hopping in which the physical tone(s) of a logical channel hop every a few OFDM symbols, or mixed symbol-by-symbol and blocked based hopping.

Downlink transmission unit generator 204 may further include a strip symbol inserter 206 that selectively positions strip OFDM symbol(s) within downlink transmission units (e.g., type 1 downlink transmission units) yielded by downlink transmission unit generator 204. For example, strip symbol inserter 206 may arrange the strip OFDM symbol at a fixed position (e.g., at the beginning of the transmission unit) and allow the non-strip OFDM symbols to fill the remaining positions. Strip symbol inserter 206 may selectively incorporate the strip OFDM symbols into the downlink transmission unit at varying positions as a function of cell identity (e.g., employing a physical layer identifier corresponding to a cell). By employing strip symbol inserter 206, alignment of strip OFDM symbols between disparate cells may be mitigated—thus, resultant interference associated with strip OFDM symbols from differing cells being transmitted at a common time may be reduced. Further, strip symbol inserter 206 may space the strip OFDM symbols as a function of expected drift.

According to one or more aspects, a strip OFDM symbol may comprise, for example, 113 tones, 56 of which may be utilized to transmit data, training information, etc., and have a non-zero energy associated with them. Further, the remaining tones are non-zero energy tones, known as null tones, that do not carry any signal transmission energy. However, the claimed subject matter is not so limited to the foregoing description of strip OFDM symbols.

Pursuant to another example, the strip OFDM symbol may be utilized to carry a Beacon signal, where a majority of transmission power is concentrated upon 1 tone; for instance, the per-tone transmission power of the Beacon signal may be much higher (e.g., 10, db, 15 db, 20 db, x db, . . . ) than an average per-tone transmission power associated with other OFDM symbols. Due to the higher transmission power, Beacon signals may be received by remotely located mobile devices and may be utilized for system acquisition and handoff. For example, mobile devices can utilize the Beacon signal to identify the cell and measure the channel gain from the cell. However, since Beacon signals tend to be peaky, difficulty is encountered when differentiating between Beacon signals from disparate base stations obtained at substantially similar times; thus, strip symbol inserter 206 may enable selectively spacing Beacon signals to mitigate Beacon signal overlap from different cells.

Mobile devices may analyze received type 1 downlink transmission units to determine an identity of a transmitting cell (e.g., base station). For example, Beacon signals may be provided in a subset of the strip OFDM symbols (e.g., every eighth strip OFDM symbol), and from the time location of the Beacon signal the identity of the cell may be determined. It is contemplated that a minimum of one Beacon signal may be used to obtain the identity of a cell; however, more than one Beacon signal may be employed for such evaluation.

Further, each cell may include one or more sectors. According to an illustration, the time location of the strip OFDM symbol and/or the Beacon carried by the strip OFDM symbol may be a function of the cell identifier; thus, different sectors of the same cell may utilize the same time location within the downlink transmission units. However, the disparate sectors may employ a different time location based upon a sector identifier, which is different for a different sector.

Figure 3:
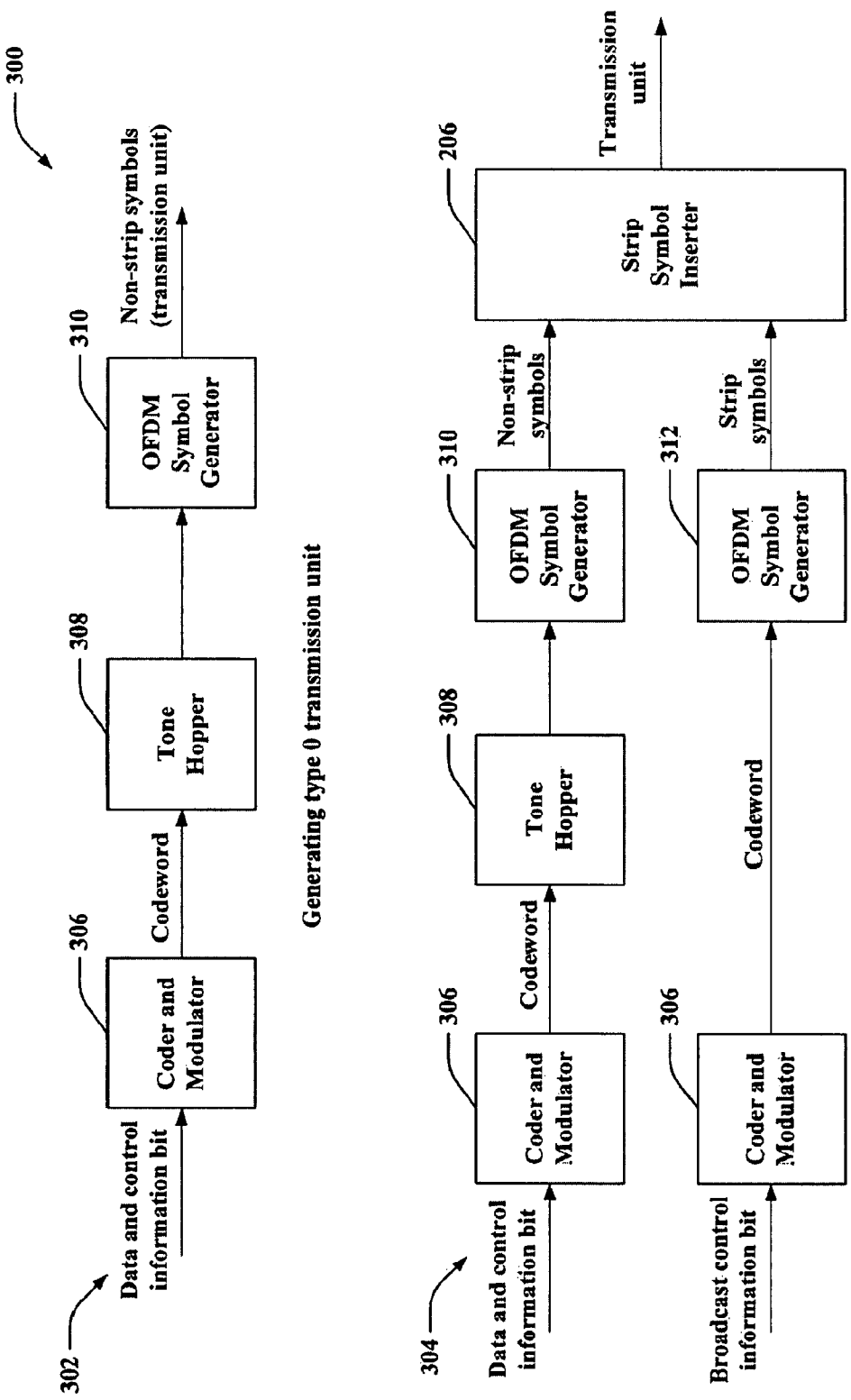
FIG. 3 is an illustration of an example system for generating type 0 and type 1 transmission units.

Turning to FIG. 3, illustrated is an example system 300 for generating type 0 and type 1 transmission units. System 300 can operate in a first mode 302 to generate type 0 transmission units and a second mode 304 to generate type 1 transmission units. According to an example, downlink transmission unit generator 204 of FIG. 2 can include system 300, and thus, can yield transmission units by leveraging system 300.

The following provides an example for operating in the first mode 302 to yield the type 0 transmission units. In particular, a data and control information bit can be coded and modulated by a coder and modulator 306 to yield a codeword. The codeword can thereafter be tone hopped by a tone hopper 308. Further, an OFDM symbol generator 310 can output the non-strip symbols that form the type 0 transmission unit.

By way of further illustration, type 1 transmission units can be generated while operating in the second mode 304. Accordingly, a data and control information bit can be coded and modulated by the coder and modulator 306. The codeword outputted by the coder and modulator 306 can be tone hoped by the tone hopper 308. Thereafter, the OFDM symbol generator 310 can yield the non-strip symbols. Moreover, a broadcast control information bit can be coded and modulated by the coder and modulator 306 to yield a corresponding codeword. This codeword can further be inputted to an OFDM symbol generator 312 that can yield strip symbols. The non-strip symbols and the strip symbols can be provided to a strip symbol inserter 206 (e.g., strip symbol inserter 206 of FIG. 2) to yield the type 1 transmission unit.

Figure 4:
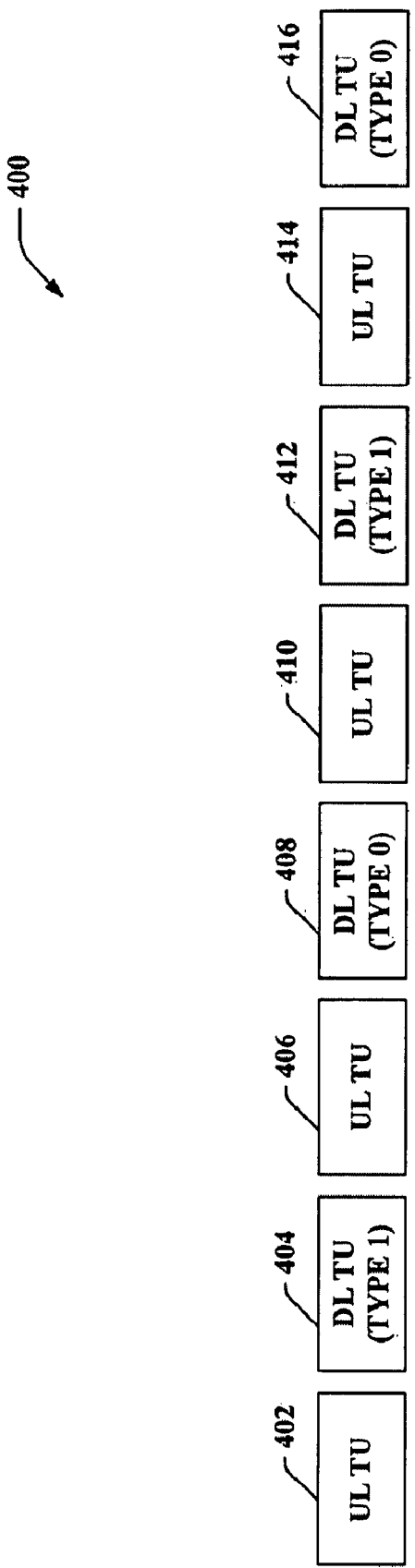
FIG. 4 is an illustration of an example superslot utilized within a wireless communication environment.

With reference to FIG. 4, illustrated is an example superslot 400 utilized within a wireless communication environment. Superslot 400 represents a time interval and may include any number of uplink transmission units (UL TUs) (e.g., transmitted from a mobile device to a base station) and any number of downlink transmission units (DL TUs) (e.g., transmitted from a base station to a mobile device). According to the illustrated example, superslot 400 may comprise four UL TUs 402, 406, 410, and 414 and four DL TUs 404, 408, 412, and 416. Further, differing types of DL TUs may be included within superslot 400; as depicted, superslot 400 comprises two type 1 DL TUs 404 and 412 (e.g., that include strip OFDM symbol(s)) and two type 0 DL TUs 408 and 416 (e.g., that need not include strip OFDM symbol(s)). Pursuant to an illustration, UL TUs 402, 406, 410, and 414 and type 0 DL TUs 408 and 416 may include 31 non-strip symbols, while type 1 DL TUs 404 and 412 may comprise 32 symbols (e.g., 31 non-strip symbols and another one strip symbol). Strip OFDM symbol(s) may be inserted in the type 1 DL TUs 404 and 412 at differing locations based upon a characteristic of a cell (e.g., cell identifier)—thus, cells may incorporate strip OFDM symbols at distinct positions as compared to disparate cells (e.g., disparate cells within a locale). Additionally, guard time intervals may be included between transmission units 402-416 of superslot 400. In a synchronized TDD system, the type 1 DL TUs occur in the same time for all the base stations, and the type 0 DL TUs occur in the same time for all the base stations.

Figure 5:
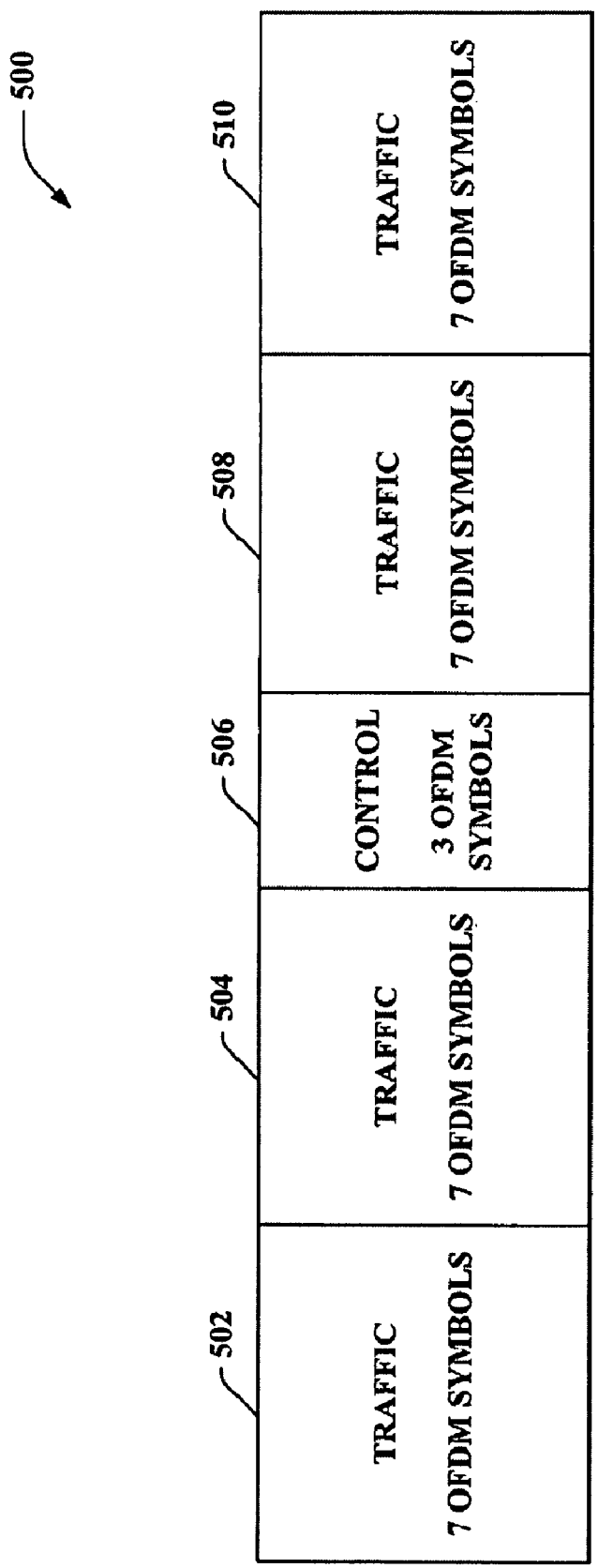
FIG. 5 is an illustration of an example type 0 downlink transmission unit (DL TU) employed in a wireless communication environment.

Turning to FIG. 5, illustrated is an example type 0 downlink transmission unit (DL TU) 500 employed in a wireless communication environment. Type 0 DL TU 500 may include 31 non-strip OFDM symbols, which may provide traffic and control data. The first 14 symbols of the type 0 DL TU 500 may be grouped into two half slots 502 and 504, and the last 14 symbols may also be grouped into another two half slots 508 and 510. Additionally, three OFDM symbols providing control data may be positioned at 506 between the first 14 symbols and the last 14 symbols. Each of the half slots 502, 504, 508, and 510 may include 7 OFDM symbols and may be utilized to provide traffic data. Further, hopping may occur at the boundary of the half slots 502, 504, 508, and 510. For instance, a hopping sequence may be defined for the non-strip OFDM symbols of type 0 DL TU 500. According to an example, a particular tone may be utilized for 7 OFDM symbols during half slot 502, and then a disparate tone may be employed for the 7 OFDM symbols of the next half slot 504, and so forth. That is, a block-based tone hopping scheme is used for the half slots 502, 504, 508, and 510. A different tone hopping scheme (e.g., symbol-by-symbol scheme) may be used in OFDM-symbols 506.

Figure 6:
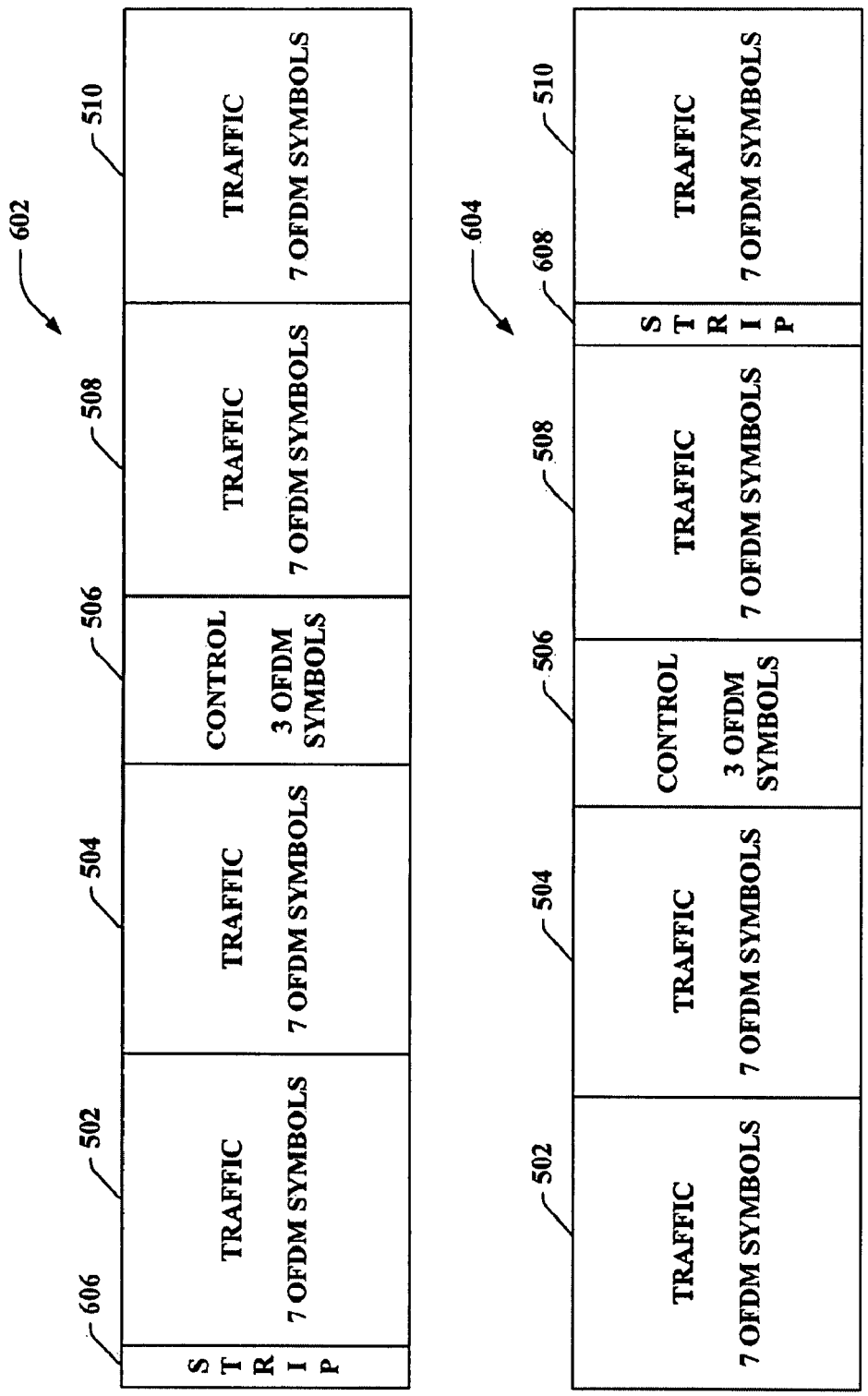
FIG. 6 is an illustration of example downlink transmission units (e.g., type 1 DL TUs) that include strip OFDM symbols positioned at hop boundaries for utilization in a wireless communication environment.

Now turning to FIG. 6, illustrated are example downlink transmission units 602 and 604 (e.g., type 1 DL TUs) that include strip OFDM symbols 606 and 608 positioned at hop boundaries for utilization in a wireless communication environment. It is to be appreciated that the claimed subject matter is not limited to the depicted locations for strip OFDM symbols 606 and 608. As noted above, strip OFDM symbols may be positioned within DL TUs as a function of a characteristic of a cell (e.g., physical layer identifier of the cell). For instance, DL TU 602 may be utilized by a first base station associated with a first cell and DL TU 604 may be employed by a second base station related to a second cell. By varying the location of the strip OFDM symbol for each cell (e.g., cells within close physical proximity), interference between strip OFDM symbols of disparate cells may be mitigated, particularly for synchronized TDD wireless communication environments. Further, the position of the strip OFDM symbols (and/or Beacon signals carried by the strip OFDM symbols) may be utilized to identify cells.

According to an example, the channel structure of the remaining non-strip OFDM symbols of the type 1 DL TU can be the same as that of the type 0 DL TU. In particular, the tone hopping scheme can be the same. The coding and modulation scheme can also be the same. The strip OFDM symbol is generated from a codeword using a different coding/modulation scheme and separately from the generation of the non-strip OFDM symbols. In another example, to preserve block hopping as described in connection with the type 0 DL TU (e.g., type 0 DL TU 500 of FIG. 5), strip OFDM symbols (e.g., strip OFDM symbols 606 and 608) may possibly be positioned before or after each half slot 502, 504, 508 and 510, or before or after each of the remaining three non-strip OFDM symbols utilized to provide control data at 506. Thus, following this example, type 1 DL TUs may include eight potential positions for the strip OFDM symbols, two of which are shown in DL TUs 602 and 604. Additionally or alternatively, strip OFDM symbol(s) may be included between half slot 502 and half slot 504, before the first control related symbol, between the first and second control related symbol, between the second and third control related symbol, after the third control related symbol, and after half slot 510. By employing the foregoing example, the seven symbols of each half slot 502, 504, 508, and 510 may remain together while the strip OFDM symbols may be inserted at hop boundaries.

Figure 7:
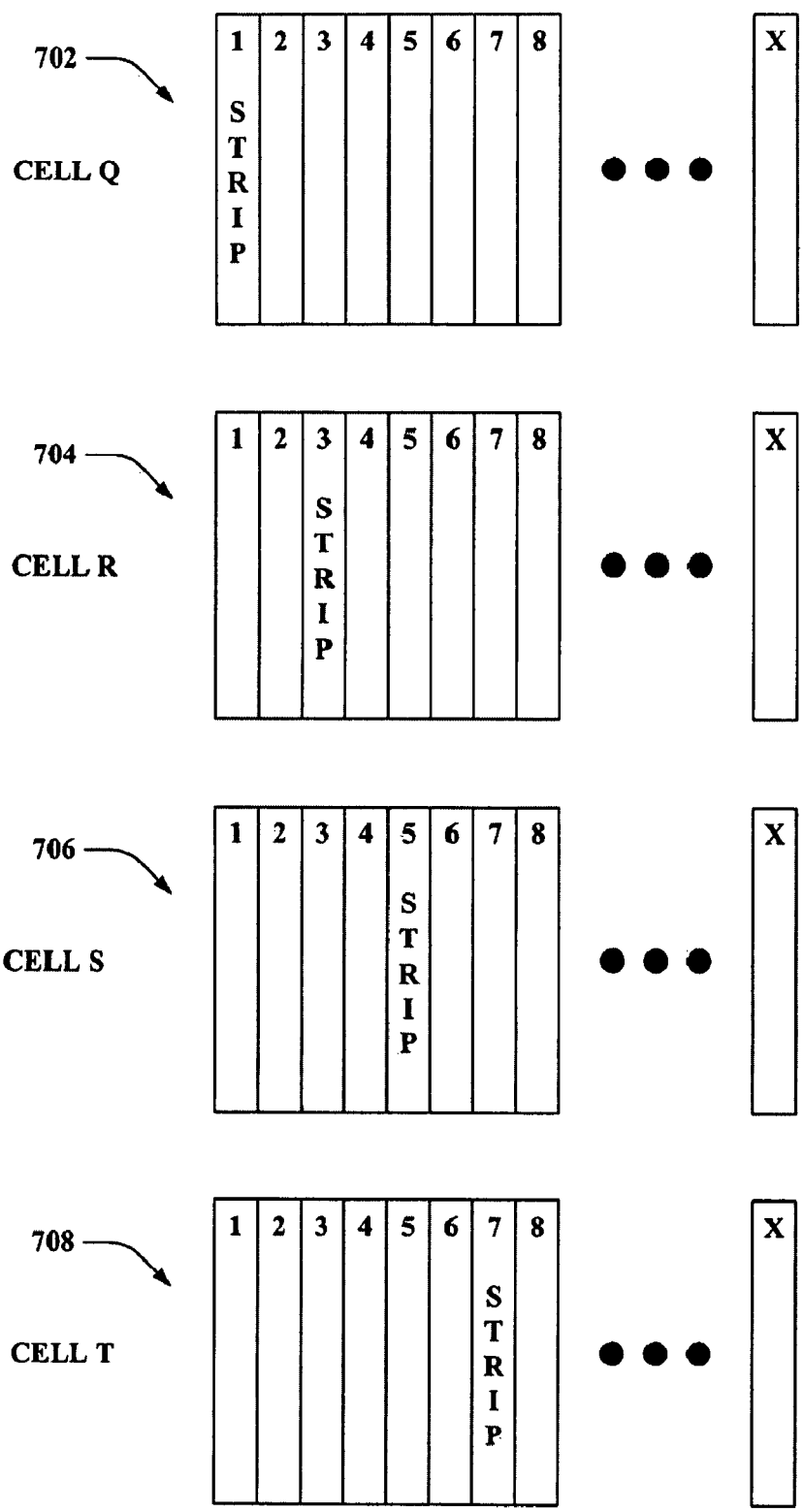
FIG. 7 is an illustration of example type 1 downlink transmission units with strip OFDM symbols selectively positioned based upon considerations of drift.

With reference to FIG. 7, illustrated are example type 1 downlink transmission units with strip OFDM symbols selectively positioned based upon considerations of timing drift (e.g., difference in the propagation delays from different base stations to a given mobile terminal). In accordance with various aspects, the type 1 downlink transmission units may include X symbols, where X may be any integer (e.g., X may be 32). For example, one of the X symbols may be a strip OFDM symbol, while the remainder of the X symbols may be non-strip OFDM symbols. The strip OFDM symbol, further, may be selectively positioned based upon an identifier associated with a cell (e.g., physical layer identifier of the cell). For instance, cell Q, cell R, cell S, and cell T may be disparate cells that yield type 1 downlink transmission units 702, 704, 706, and 708, respectively; further, each of these cells may multiplex the strip OFDM symbol at corresponding unique locations within the type 1 downlink transmission units. Thus, the strip OFDM symbol may be the first symbol included in a downlink transmission unit for a first cell (e.g., cell Q), a third symbol for a differing cell (e.g., cell R), and so forth. Pursuant to the depicted example, cells may position the strip OFDM symbols with a separation of one symbol (e.g., one cell may insert a strip OFDM symbol as the first symbol, no cell may insert a strip OFDM symbol as the second symbol, a disparate cell may insert a strip OFDM symbol as the third symbol, . . . ); however, it is to be appreciated that any size separation may be utilized in connection with the claimed subject matter.

According to an example, propagation differences may cause a mobile device to receive symbols of downlink transmission units transferred simultaneously from differing base stations at slightly disparate times, which yields drift. For instance, propagation differences may be a function of cell size, distance from each base station to the mobile device, and the like. Accordingly, a symbol transferred from a first cell during a first synchronized time may interfere with a symbol transmitted from a second cell during a second synchronized time. Further, the separation between strip OFDM symbols of differing cells may be based upon the expected drift; thus, if the drift is half a symbol, then a separation of one symbol may be employed, while if the drift is one symbol, then a separation of two symbols may be utilized, for example.

Referring to FIGS. 8-11, methodologies relating to selectively positioning strip OFDM symbols in downlink transmission units for utilization in wireless communication environments are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 8:
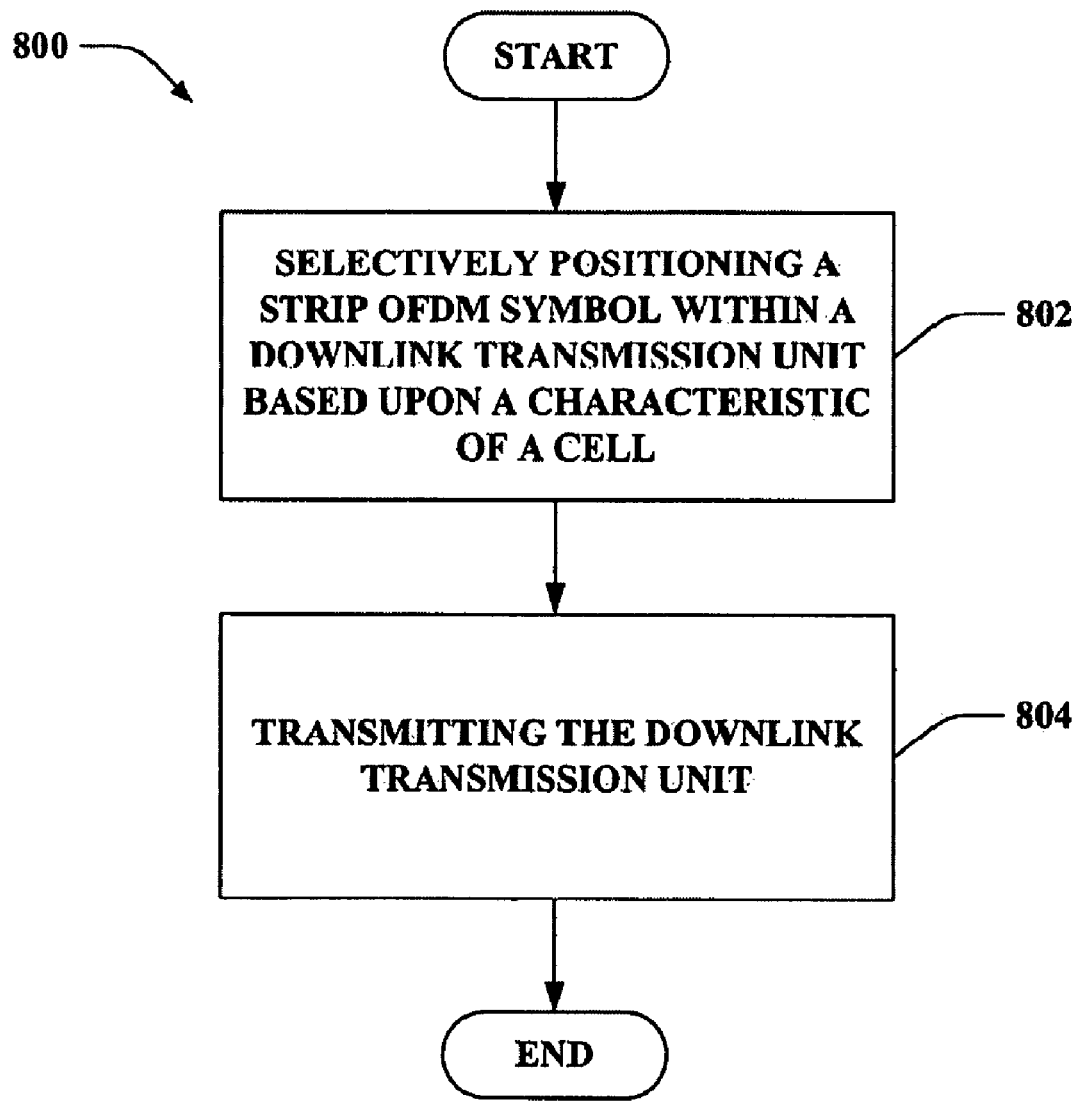
FIG. 8 is an illustration of an example methodology that facilitates mitigating interference within an OFDM TDD environment.

With reference to FIG. 8, illustrated is a methodology 800 that facilitates mitigating interference within an OFDM TDD environment. At 802, a strip OFDM symbol may be selectively positioned within a downlink transmission unit based upon a characteristic of a cell. For instance, the characteristic may be a cell identifier. The strip OFDM symbol may be selectively positioned to mitigate alignment with a disparate strip OFDM symbol in a differing downlink transmission unit generated for transfer by a different cell. According to an example, the strip OFDM symbol may be included at a location adjacent to a half slot boundary or a non-strip, control OFDM symbol in the downlink transmission unit. Pursuant to a further example, the strip OFDM symbol may be interposed in the downlink transmission unit at a location based upon a consideration of expected drift. Moreover, according to an illustration, the downlink transmission unit may include 31 non-strip OFDM symbols and one strip OFDM symbol. In accordance with another example, the position of the strip OFDM symbol may vary as a function of time (e.g., from one transmission unit to another). At 804, the downlink transmission unit may be transmitted. For example, the downlink transmission unit may be sent over a downlink during allocated time(s) within a superslot. Further, uplink transmission unit(s) and downlink transmission unit(s) lacking a strip OFDM symbol (e.g., that include 31 non-strip OFDM symbols) may be transmitted during disparate times within the superslot.

Figure 9:
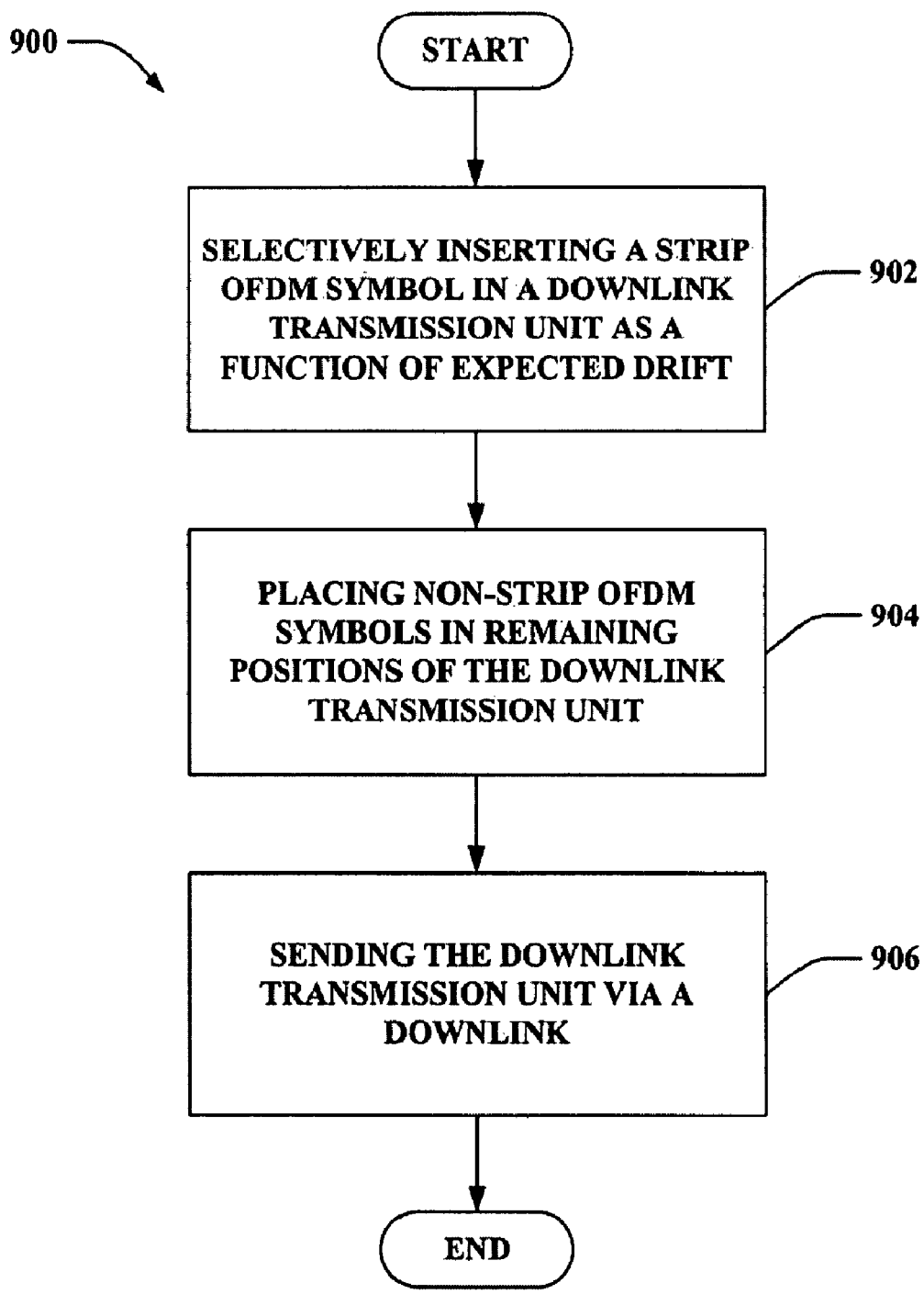
FIG. 9 is an illustration of an example methodology that facilitates generating downlink transmission units within an OFDM TDD environment.

Now turning to FIG. 9, illustrated is a methodology 900 that facilitates generating downlink transmission units within an OFDM TDD environment. At 902, a strip OFDM symbol may be selectively inserted in a downlink transmission unit as a function of expected drift. For example, expected drift may be associated with differences in propagation that yield shifts in time associated with receipt at a mobile device of downlink transmission units transmitted concurrently from disparate cells. At 904, non-strip OFDM symbols may be placed in the remaining positions of the downlink transmission unit. For example, 31 non-strip OFDM symbols may be included in the downlink transmission unit; however, the claimed subject matter is not so limited. At 906, the downlink transmission unit may be sent via a downlink.

Figure 10:
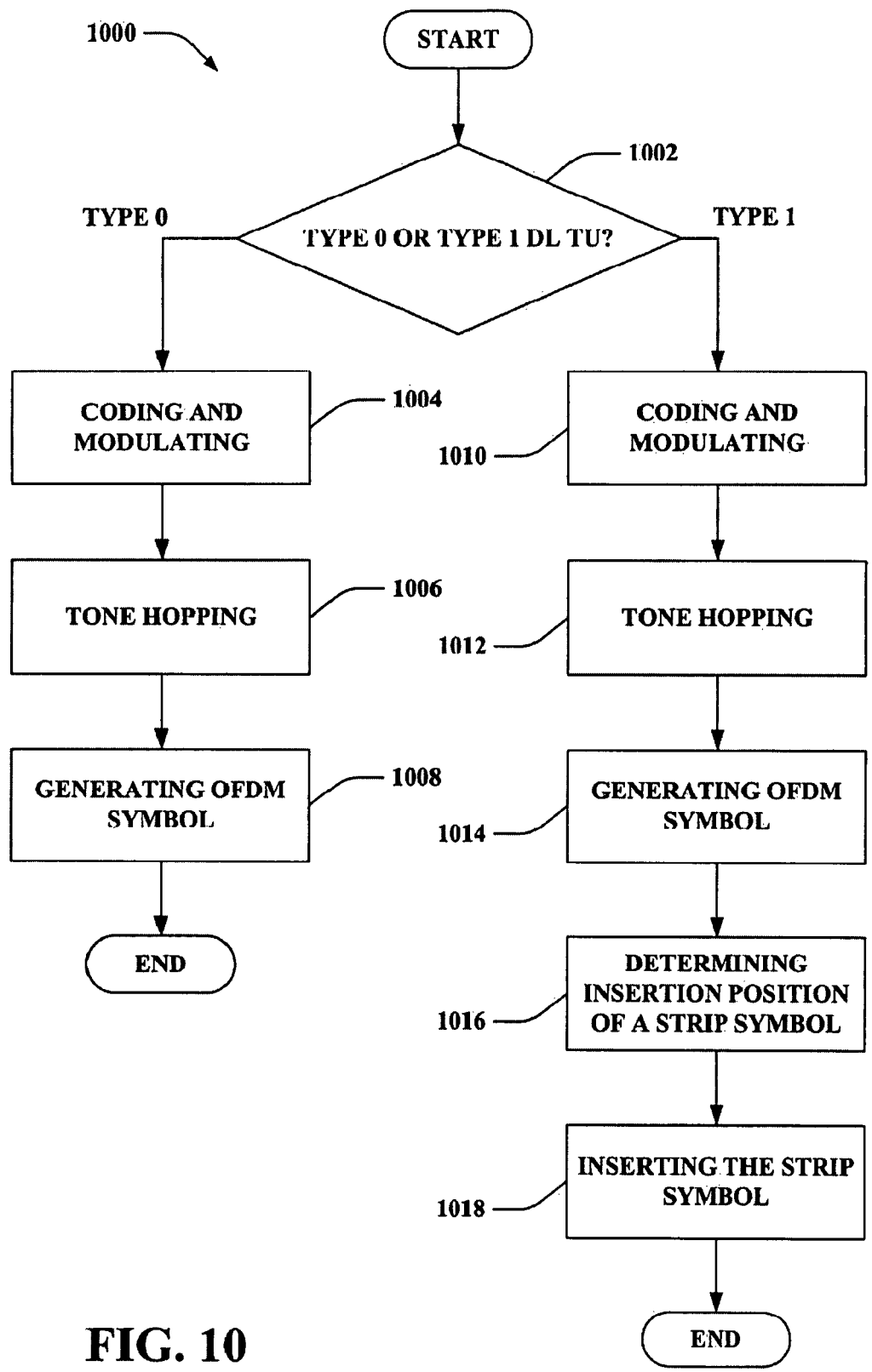
FIG. 10 is an illustration of an example methodology that facilitates generating type 0 and type 1 downlink transmission units.

Turning to FIG. 10, illustrated is a methodology 1000 that facilitates generating type 0 and type 1 downlink transmission units. At 1002, a determination may be effectuated as to whether a type 0 or a type 1 downlink transmission unit is to be generated. By way of example, such a determination may be made based upon a schedule (e.g., a particular time within a superslot, . . . ). If a type 0 downlink transmission unit is to be yielded, the methodology 1000 continues to 1004. At 1004, data and control information bit(s) may be coded and modulated. At 1006, a resulting codeword may be tone hopped. At 1008, OFDM symbol(s) may be generated that may form the type 0 downlink transmission unit. For instance, a plurality of non-strip symbols may be yielded for the type 0 downlink transmission unit. If it is determined at 1002 that a type 1 downlink transmission unit is to be generated, then the methodology 1000 continues to 1010. At 1010, data and control information bit(s) may be coded and modulated. Further, broadcast control information bit(s) may be coded and modulated. At 1012, a codeword corresponding to the data and control information bit(s) may be tone hoped (e.g., a codeword related to the broadcast control information bit need not be tone hopped). At 1014, OFDM symbol(s) (e.g., non-strip symbol(s), strip symbol(s)) may be generated. At 1016, an insertion position of a strip symbol in the type 1 downlink transmission unit may be determined (e.g., based upon a cell identifier, expected drift, . . . ). At 1018, the strip symbol may be inserted within non-strip symbols to yield the type 1 downlink transmission unit.

Figure 11:
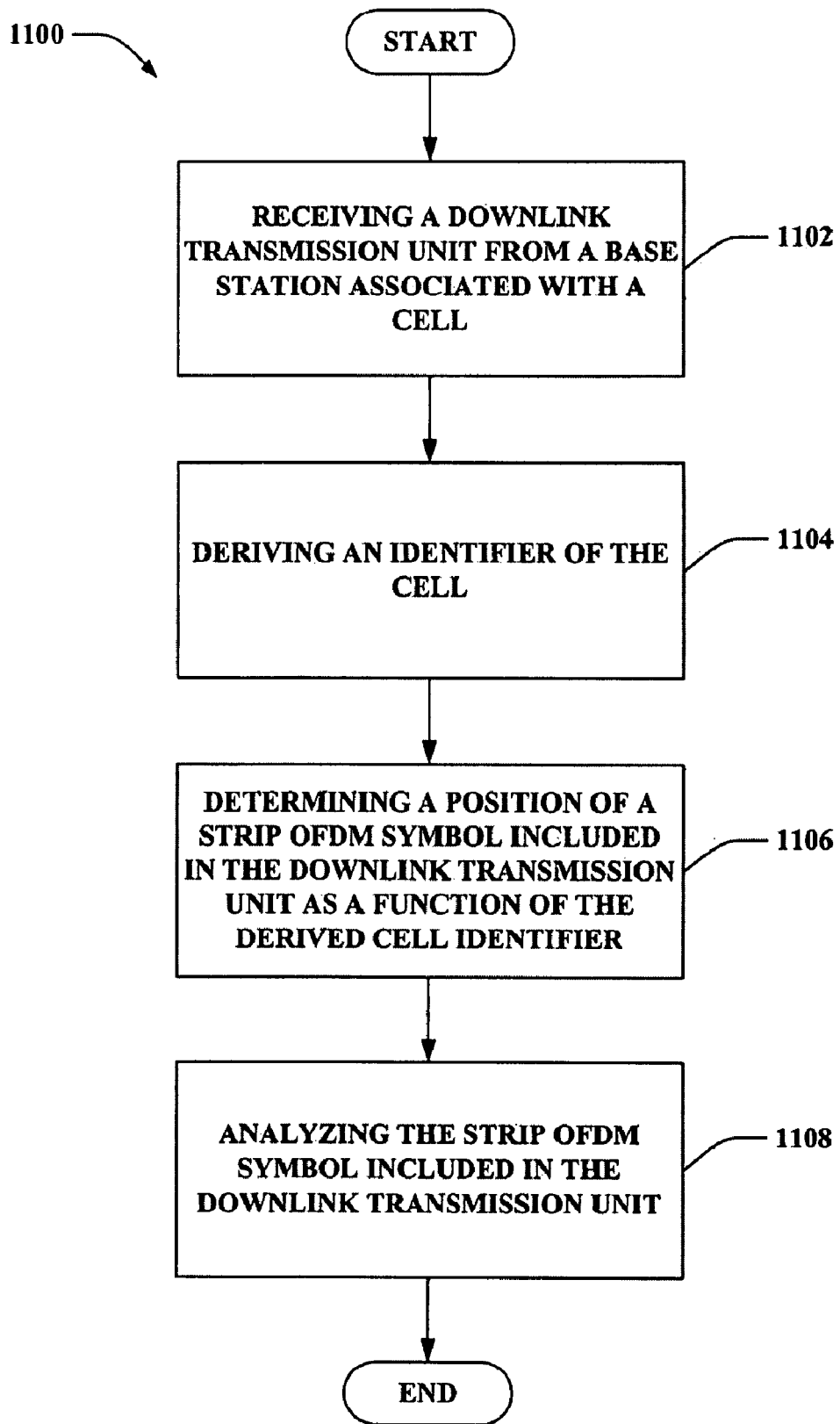
FIG. 11 is an illustration of an example methodology that facilitates obtaining downlink transmission units with selectively spaced strip OFDM symbols in an OFDM TDD environment.

Referring now to FIG. 11, illustrated is a methodology 1100 that facilitates obtaining downlink transmission units with selectively spaced strip OFDM symbols in an OFDM TDD environment. At 1102, a downlink transmission unit may be received from a base station associated with a cell. For example, the downlink transmission unit may be a type 1 downlink transmission unit that includes M strip OFDM symbols and N non-strip OFDM symbols, where M and N may be any integers. Pursuant to an example, the type 1 downlink transmission unit may include 1 strip OFDM symbol and 31 non-strip OFDM symbols; however, the claimed subject matter is not so limited. At 1104, an identifier of the cell may be derived. The cell identifier may be uniquely allocated to the cell within a geographic region. At 1106, a position of a strip OFDM symbol included in the downlink transmission unit may be determined as a function of the derived cell identifier. Further, the position of the strip OFDM symbol may differ from a location of a different strip OFDM symbol that may be obtained from a disparate cell. At 1108, the strip OFDM symbol included in the downlink transmission unit may be analyzed. Further, although not shown, it is contemplated that method 1100 may include determining whether the downlink transmission unit is type 0 or type 1. Moreover, for a type 1 downlink transmission unit, subsequent to analyzing the strip OFDM symbol, a remainder of the downlink transmission unit may be de-hopped and decoded to recover non-strip OFDM symbol(s).

It will be appreciated that, in accordance with one or more aspects described herein, inferences can be made regarding generating downlink transmission units and/or identifying sources of received downlink transmission units. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to electing a location to insert a strip OFDM symbol within a downlink transmission unit. In accordance with another example, an inference may be made related to identifying an expected drift, which may be utilized in connection with selectively position strip OFDM symbols in downlink transmission units. By way of further illustration, an inference may be made related to determining an identity of a cell that generated and/or transmitted a received downlink transmission unit. It will be appreciated that the foregoing examples are illustrative in nature and are not intended to limit the number of inferences that can be made or the manner in which such inferences are made in conjunction with the various embodiments and/or methods described herein.

Figure 12:
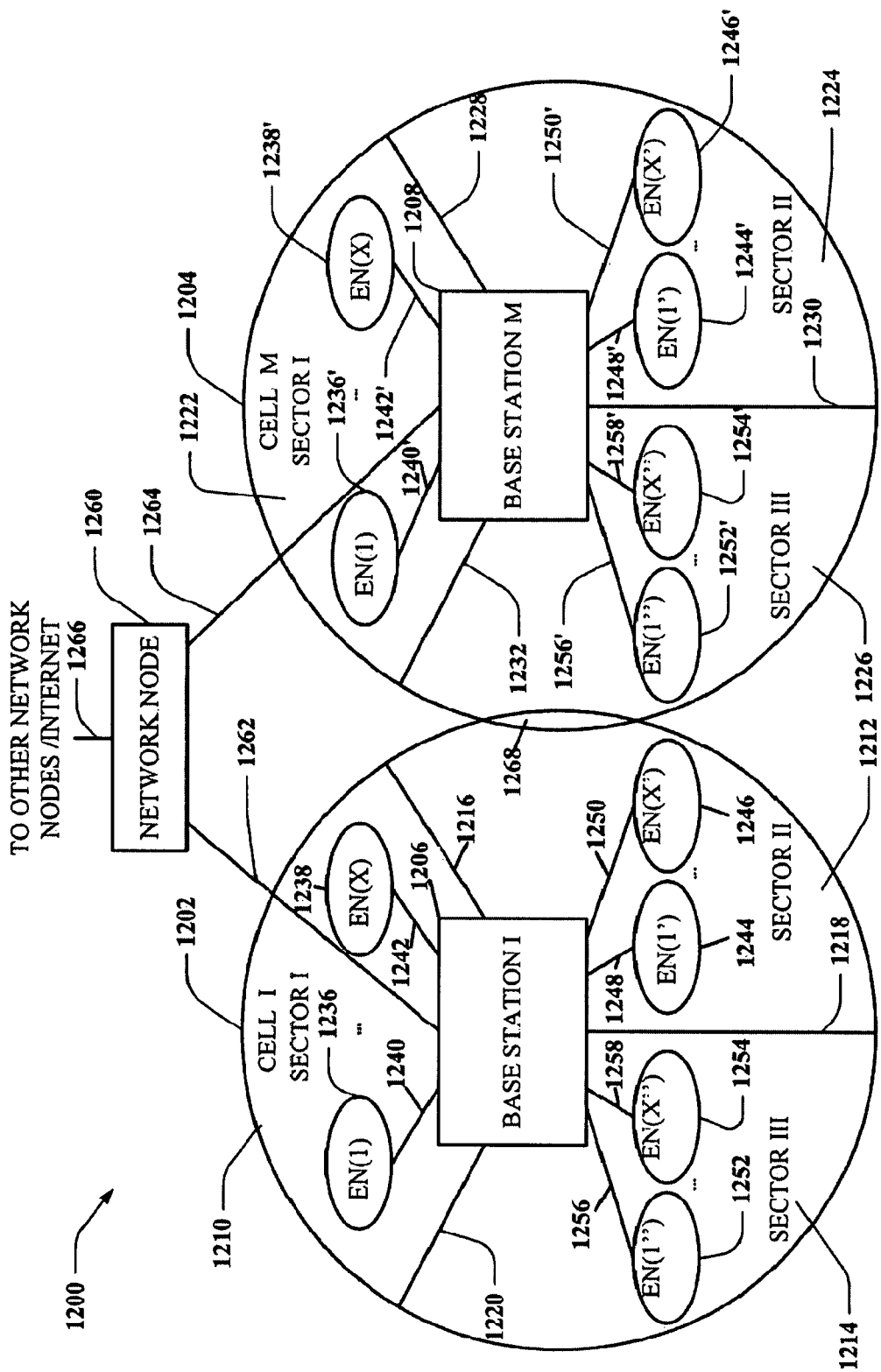
FIG. 12 is an illustration of an example communication system implemented in accordance with various aspects including multiple cells.

FIG. 12 depicts an example communication system 1200 implemented in accordance with various aspects including multiple cells: cell I 1202, cell M 1204. Note that neighboring cells 1202, 1204 overlap slightly, as indicated by cell boundary region 1268, thereby creating potential for signal interference between signals transmitted by base stations in neighboring cells. Each cell 1202, 1204 of system 1200 includes three sectors. Cells which have not be subdivided into multiple sectors (N=1), cells with two sectors (N=2) and cells with more than 3 sectors (N>3) are also possible in accordance with various aspects. Cell 1202 includes a first sector, sector I 1210, a second sector, sector II 1212, and a third sector, sector III 1214. Each sector 1210, 1212, 1214 has two sector boundary regions; each boundary region is shared between two adjacent sectors.

Sector boundary regions provide potential for signal interference between signals transmitted by base stations in neighboring sectors. Line 1216 represents a sector boundary region between sector I 1210 and sector II 1212; line 1218 represents a sector boundary region between sector II 1212 and sector III 1214; line 1220 represents a sector boundary region between sector III 1214 and sector 1 1210. Similarly, cell M 1204 includes a first sector, sector I 1222, a second sector, sector II 1224, and a third sector, sector III 1226. Line 1228 represents a sector boundary region between sector I 1222 and sector II 1224; line 1230 represents a sector boundary region between sector II 1224 and sector III 1226; line 1232 represents a boundary region between sector III 1226 and sector I 1222. Cell I 1202 includes a base station (BS), base station I 1206, and a plurality of end nodes (ENs) (e.g., mobile devices) in each sector 1210, 1212, 1214. Sector I 1210 includes EN(1) 1236 and EN(X) 1238 coupled to BS 1206 via wireless links 1240, 1242, respectively; sector II 1212 includes EN(1') 1244 and EN(X') 1246 coupled to BS 1206 via wireless links 1248, 1250, respectively; sector III 1214 includes EN(1") 1252 and EN(X") 1254 coupled to BS 1206 via wireless links 1256, 1258, respectively. Similarly, cell M 1204 includes base station M 1208, and a plurality of end nodes (ENs) in each sector 1222, 1224, 1226. Sector I 1222 includes EN(1) 1236' and EN(X) 1238' coupled to BS M 1208 via wireless links 1240', 1242', respectively; sector II 1224 includes EN(1') 1244' and EN(X') 1246' coupled to BS M 1208 via wireless links 1248', 1250', respectively; sector 3 1226 includes EN(1") 1252' and EN(X") 1254' coupled to BS 1208 via wireless links 1256', 1258', respectively.

System 1200 also includes a network node 1260 which is coupled to BS I 1206 and BS M 1208 via network links 1262, 1264, respectively. Network node 1260 is also coupled to other network nodes, e.g., other base stations, AAA server nodes, intermediate nodes, routers, etc. and the Internet via network link 1266. Network links 1262, 1264, 1266 may be, e.g., fiber optic cables. Each end node, e.g., EN(1) 1236 may be a wireless terminal including a transmitter as well as a receiver. The wireless terminals, e.g., EN(1) 1236 may move through system 1200 and may communicate via wireless links with the base station in the cell in which the EN is currently located. The wireless terminals, (WTs), e.g., EN(1) 1236, may communicate with peer nodes, e.g., other WTs in system 1200 or outside system 1200 via a base station, e.g., BS 1206, and/or network node 1260. WTs, e.g., EN(1) 1236 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones.

Figure 13:
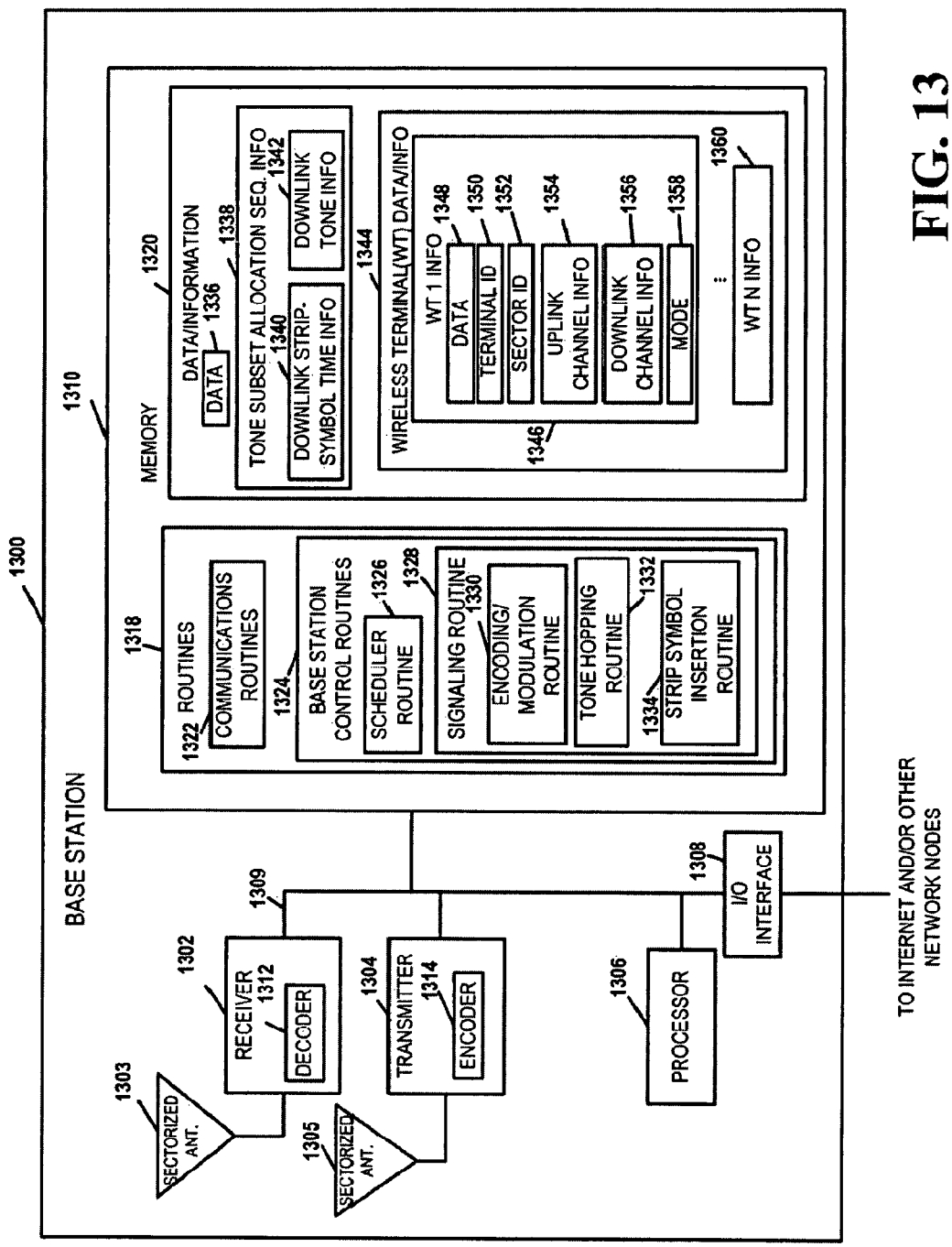
FIG. 13 is an illustration of an example base station in accordance with various aspects.

FIG. 13 illustrates an example base station 1300 in accordance with various aspects. Base station 1300 implements tone subset allocation sequences, with different tone subset allocation sequences generated for respective different sector types of the cell. Base station 1300 may be used as any one of base stations 1206, 1208 of the system 1200 of FIG. 12. The base station 1300 includes a receiver 1302, a transmitter 1304, a processor 1306, e.g., CPU, an input/output interface 1308 and memory 1310 coupled together by a bus 1309 over which various elements 1302, 1304, 1306, 1308, and 1310 may interchange data and information.

Sectorized antenna 1303 coupled to receiver 1302 is used for receiving data and other signals, e.g., channel reports, from wireless terminals transmissions from each sector within the base station's cell. Sectorized antenna 1305 coupled to transmitter 1304 is used for transmitting data and other signals, e.g., control signals, pilot signal, beacon signals, etc. to wireless terminals 1400 (see FIG. 14) within each sector of the base station's cell. In various aspects, base station 1300 may employ multiple receivers 1302 and multiple transmitters 1304, e.g., an individual receiver 1302 for each sector and an individual transmitter 1304 for each sector. Processor 1306, may be, e.g., a general purpose central processing unit (CPU). Processor 1306 controls operation of base station 1300 under direction of one or more routines 1318 stored in memory 1310 and implements the methods. I/O interface 1308 provides a connection to other network nodes, coupling the BS 1300 to other base stations, access routers, AAA server nodes, etc., other networks, and the Internet. Memory 1310 includes routines 1318 and data/information 1320.

Data/information 1320 includes data 1336, tone subset allocation sequence information 1338 including downlink strip-symbol time information 1340 and downlink tone information 1342, and wireless terminal (WT) data/info 1344 including a plurality of sets of WT information: WT 1 info 1346 and WT N info 1360. Each set of WT info, e.g., WT 1 info 1346 includes data 1348, terminal ID 1350, sector ID 1352, uplink channel information 1354, downlink channel information 1356, and mode information 1358.

Routines 1318 include communications routines 1322 and base station control routines 1324. Base station control routines 1324 includes a scheduler routine 1326 and signaling routines 1328 including an encoding/modulation routine 1330, a tone hopping routine 1332, and a strip symbol insertion routine 1334. Scheduler routine 1326 controls determining a type of downlink transmission unit to transmit (e.g., type 0, type 1, . . . ).

Data 1336 includes data to be transmitted that will be sent to encoder 1314 of transmitter 1304 for encoding prior to transmission to WTs, and received data from WTs that has been processed through decoder 1312 of receiver 1302 following reception. Downlink strip-symbol time information 1340 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1342 includes information including a carrier frequency assigned to the base station 1300, the number and frequency of tones, and the set of tone subsets to be allocated to the strip-symbol periods, and other cell and sector specific values such as slope, slope index and sector type.

Data 1348 may include data that WT1 1400 has received from a peer node, data that WT 1 1400 desires to be transmitted to a peer node, and downlink channel quality report feedback information. Terminal ID 1350 is a base station 1300 assigned ID that identifies WT 1 1400. Sector ID 1352 includes information identifying the sector in which WT1 1400 is operating. Sector ID 1352 can be used, for example, to determine the sector type. Uplink channel information 1354 includes information identifying channel segments that have been allocated by scheduler 1326 for WT1 1400 to use, e.g., uplink traffic channel segments for data, dedicated uplink control channels for requests, power control, timing control, etc. Each uplink channel assigned to WT1 1400 includes one or more logical tones, each logical tone following an uplink hopping sequence. Downlink channel information 1356 includes information identifying channel segments that have been allocated by scheduler 1326 to carry data and/or information to WT1 1400, e.g., downlink traffic channel segments for user data. Each downlink channel assigned to WT1 1400 includes one or more logical tones, each following a downlink hopping sequence. Mode information 1358 includes information identifying the state of operation of WT1 1400, e.g. sleep, hold, on.

Communications routines 1322 control the base station 1300 to perform various communications operations and implement various communications protocols. Base station control routines 1324 are used to control the base station 1300 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1328 controls the operation of receiver 1302 with its decoder 1312 and transmitter 1304 with its encoder 1314. The signaling routine 1328 is responsible for controlling the generation of transmitted data 1336 and control information. Encoding/modulation routine 1330 controls coding and modulation for non-strip symbols and strip symbols. Further, tone hopping routine 1332 controls tone hopping in connection with non-strip symbols. Moreover, strip symbol insertion routine 1334 controls selectively positioning a strip symbol within a type 1 downlink transmission unit.

Figure 14:
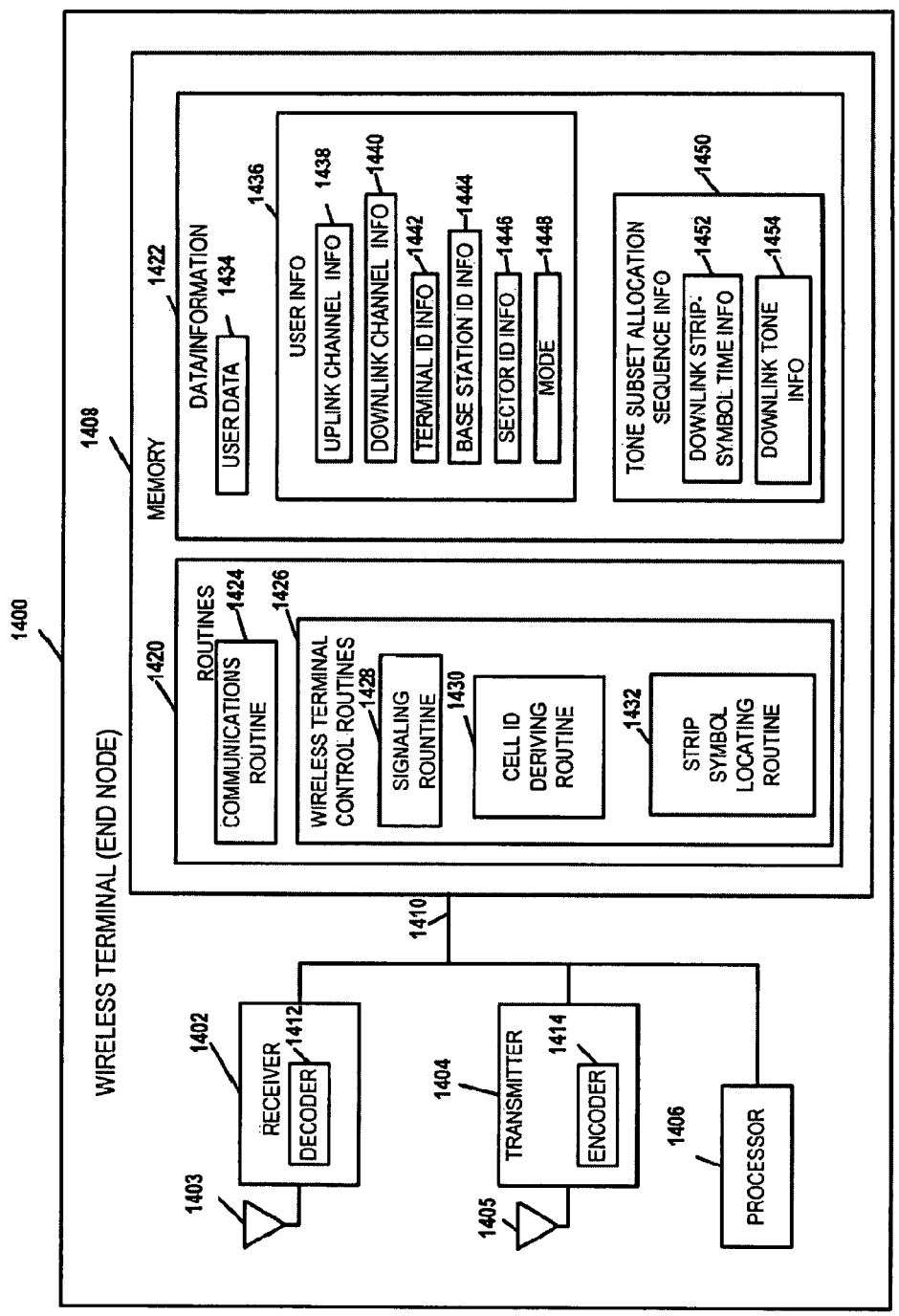
FIG. 14 is an illustration of an example wireless terminal (e.g., mobile device, end node, . . . ) implemented in accordance with various aspects described herein.

FIG. 14 illustrates an example wireless terminal (e.g., end node, mobile device, . . . ) 1400 which can be used as any one of the wireless terminals (e.g., end nodes, mobile devices, . . . ), e.g., EN(1) 1236, of the system 1200 shown in FIG. 12. Wireless terminal 1400 implements the tone subset allocation sequences. The wireless terminal 1400 includes a receiver 1402 including a decoder 1412, a transmitter 1404 including an encoder 1414, a processor 1406, and memory 1408 which are coupled together by a bus 1410 over which the various elements 1402, 1404, 1406, 1408 can interchange data and information. An antenna 1403 used for receiving signals from a base station 1300 is coupled to receiver 1402. An antenna 1405 used for transmitting signals, e.g., to base station 1300 is coupled to transmitter 1404.

The processor 1406, e.g., a CPU controls the operation of the wireless terminal 1400 and implements methods by executing routines 1420 and using data/information 1422 in memory 1408.

Data/information 1422 includes user data 1434, user information 1436, and tone subset allocation sequence information 1450. User data 1434 may include data, intended for a peer node, which will be routed to encoder 1414 for encoding prior to transmission by transmitter 1404 to base station 1300, and data received from the base station 1300 which has been processed by the decoder 1412 in receiver 1402. User information 1436 includes uplink channel information 1438, downlink channel information 1440, terminal ID information 1442, base station ID information 1444, sector ID information 1446, and mode information 1448. Uplink channel information 1438 includes information identifying uplink channels segments that have been assigned by base station 1300 for wireless terminal 1400 to use when transmitting to the base station 1300. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1440 includes information identifying downlink channel segments that have been assigned by base station 1300 to WT 1400 for use when BS 1300 is transmitting data/information to WT 1400. Downlink channels may include downlink traffic channels and assignment channels, each downlink channel including one or more logical tone, each logical tone following a downlink hopping sequence, which is synchronized between each sector of the cell.

User info 1436 also includes terminal ID information 1442, which is a base station 1300 assigned identification, base station ID information 1444 which identifies the specific base station 1300 that WT has established communications with, and sector ID info 1446 which identifies the specific sector of the cell where WT 1400 is presently located. Base station ID 1444 provides a cell slope value and sector ID info 1446 provides a sector index type; the cell slope value and sector index type may be used to derive tone hopping sequences. Mode information 1448 also included in user info 1436 identifies whether the WT 1400 is in sleep mode, hold mode, or on mode.

Tone subset allocation sequence information 1450 includes downlink strip-symbol time information 1452 and downlink tone information 1454. Downlink strip-symbol time information 1452 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1454 includes information including a carrier frequency assigned to the base station 1300, the number and frequency of tones, and the set of tone subsets to be allocated to the strip-symbol periods, and other cell and sector specific values such as slope, slope index and sector type.

Routines 1420 include communications routines 1424 and wireless terminal control routines 1426. Communications routines 1424 control the various communications protocols used by WT 1400. Wireless terminal control routines 1426 control basic wireless terminal 1400 functionality including the control of the receiver 1402 and transmitter 1404. Wireless terminal control routines 1426 include the signaling routine 1428. Wireless terminal control routines 1426 further includes a cell ID deriving routine 1430 and a strip symbol locating routine 1432. Cell ID deriving routine 1430 can determine an identifier of a cell. Further, strip symbol locating routine 1432 can identify a position of a strip OFDM symbol within a type 1 downlink transmission unit as a function of the derived cell identifier. Thereafter, the strip OFDM symbol can be analyzed as described herein.

Figure 15:
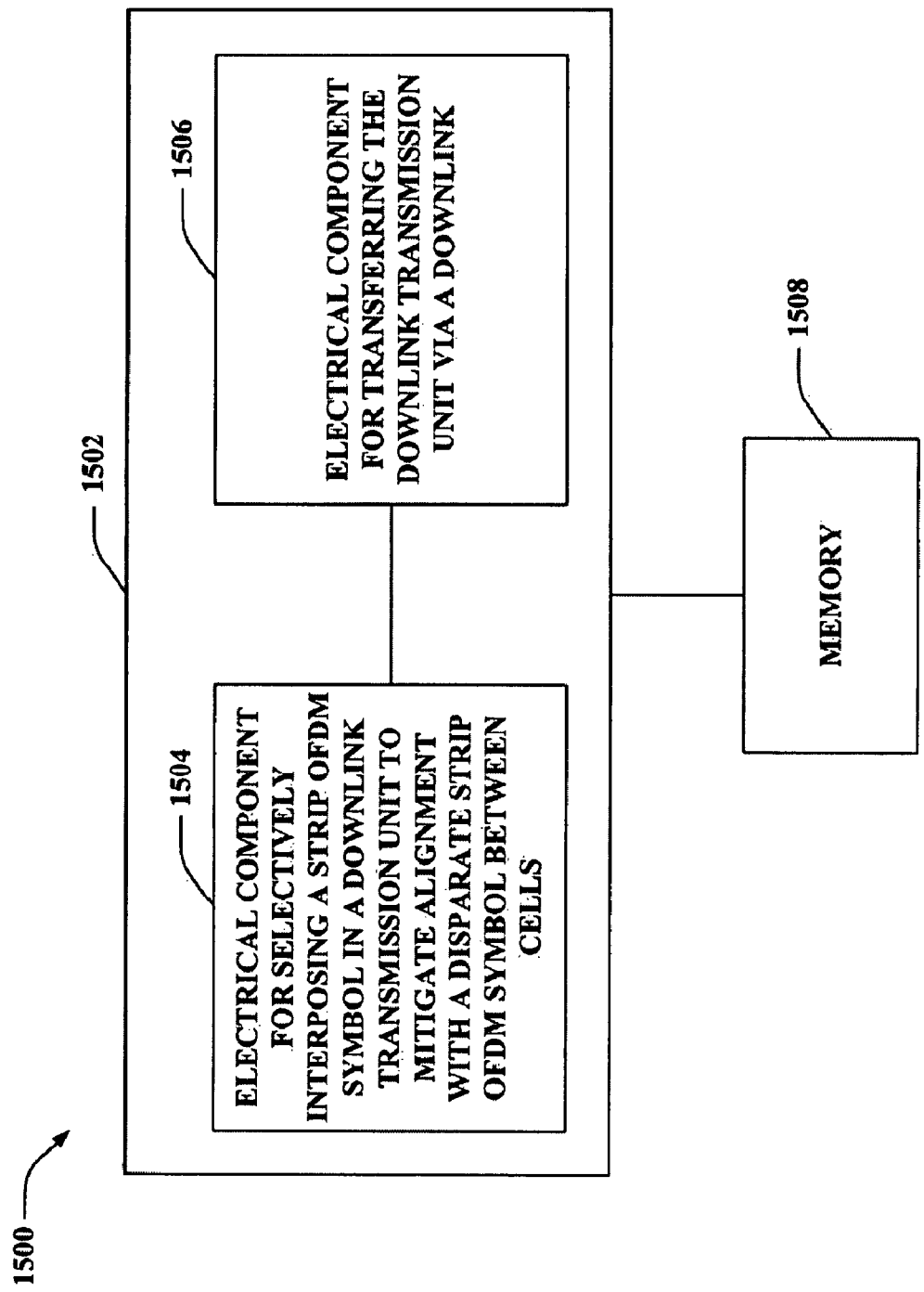
FIG. 15 is an illustration of an example system that generates downlink transmission units in connection with an OFDM TDD environment.

With reference to FIG. 15, illustrated is a system 1500 that generates downlink transmission units in connection with an OFDM TDD environment. For example, system 1500 may reside at least partially within a base station. It is to be appreciated that system 1500 is represented as including functional blocks, which may be functional blocks that represent functions implemented by a processor, software, or combination thereof (e.g., firmware). System 1500 includes a logical grouping 1502 of electrical components that can act in conjunction. For instance, logical grouping 1502 may include an electrical component for selectively interposing a strip OFDM symbol in a downlink transmission unit to mitigate alignment with a disparate strip OFDM symbol between cells 1504. For example, the strip OFDM symbol may be positioned at a location that corresponds to a characteristic (e.g., cell identifier) of a particular cell associated with the downlink transmission unit. By way of illustration, the strip OFDM symbol may be included at a position abutting a half slot or a non-strip, control OFDM symbol. According to another example, the strip OFDM symbol may be positioned as a function of expected drift. Further, logical grouping 1502 may comprise an electrical component for transferring the downlink transmission unit via a downlink 1506. For example, the downlink transmission unit may be transferred during an allotted time slot within a superslot. Additionally, system 1500 may include a memory 1508 that retains instructions for executing functions associated with electrical components 1504 and 1506. While shown as being external to memory 1508, it is to be understood that one or more of electrical components 1504 and 1506 may exist within memory 1508.

Figure 16:
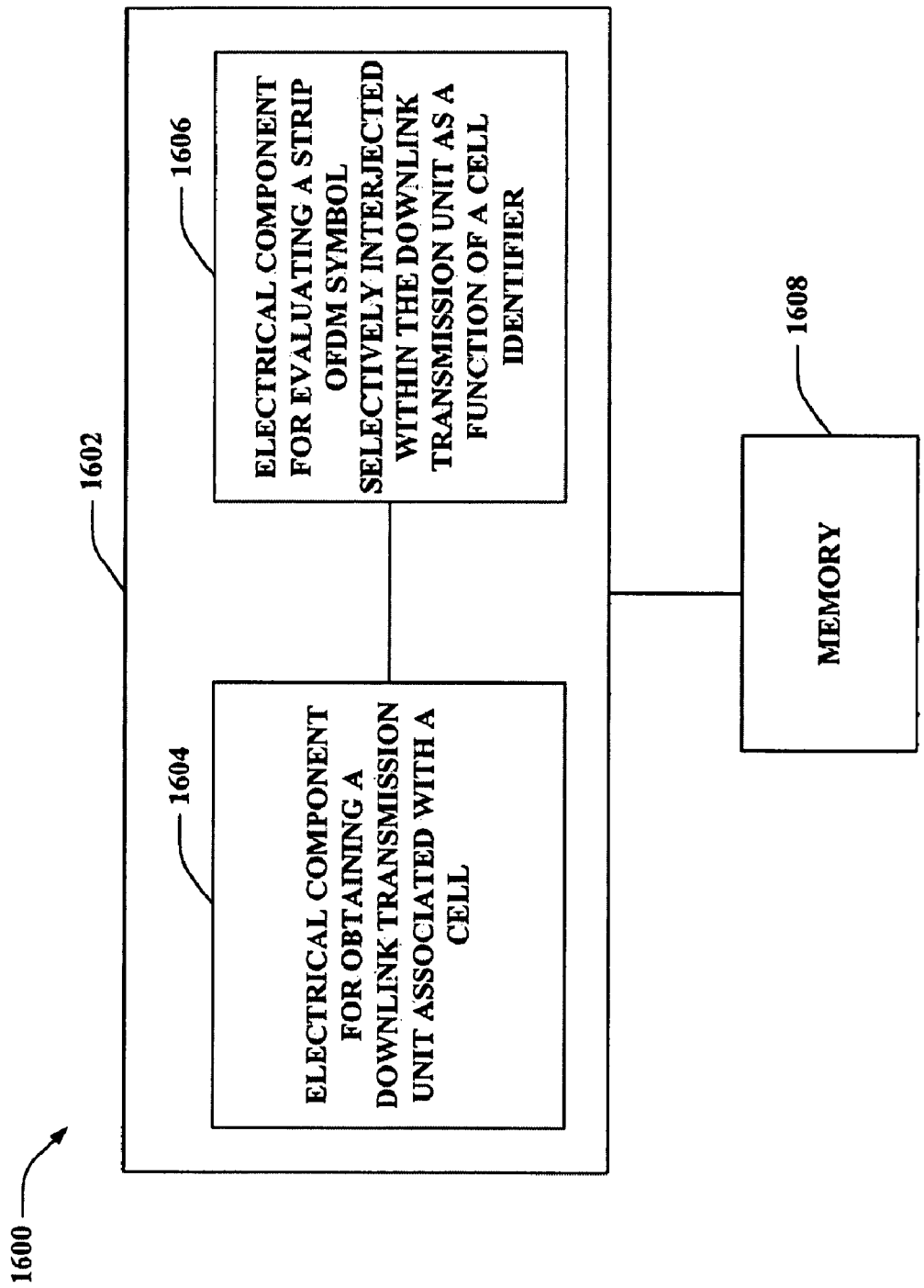
FIG. 16 is an illustration of an example system that employs a downlink transmission unit that includes a strip OFDM symbol in an OFDM TDD environment.

Turning to FIG. 16, illustrated is a system 1600 that employs a downlink transmission unit that includes a strip OFDM symbol in an OFDM TDD environment. System 1600 may reside within a mobile device, for instance. As depicted, system 1600 includes functional blocks that may represent functions implemented by a processor, software, or combination thereof (e.g., firmware). System 1600 includes a logical grouping 1602 of electrical components that facilitate receiving and/or analyzing downlink transmission units. Logical grouping 1602 may include an electrical component for obtaining a downlink transmission unit associated with a cell 1604. For example, the downlink transmission unit may be obtained as well as a disparate downlink transmission unit associated with a disparate cell. Moreover, logical grouping 1602 may include an electrical component for evaluating a strip OFDM symbol selectively interjected within the downlink transmission unit as a function of a cell identifier 1606. Thus, according to the above example whereby a disparate downlink transmission associated with a disparate cell is additionally obtained, strip OFDM symbols of each of the downlink transmission units may be positioned at different time locations; thus, alignment between strip OFDM symbols may be mitigated. Additionally, system 1600 may include a memory 1608 that retains instructions for executing functions associated with electrical components 1604 and 1606. While shown as being external to memory 1608, it is to be understood that electrical components 1604 and 1606 may exist within memory 1608.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A communications method, comprising:
   generating a strip Orthogonal Frequency Division Multiplexing (OFDM) symbol;
   generating non-strip OFDM symbols using a first tone hopping sequence, tone hopping in said non-strip OFDM symbols being independent of said generation of said strip OFDM symbol;

generating a downlink transmission unit of a first type, said downlink transmission unit of a first type including a sequence of OFDM symbols including said strip OFDM symbol and a plurality of non-strip OFDM symbols, said step of generating a downlink transmission unit of the first type including:
selectively positioning said strip OFDM symbol at an OFDM symbol location in said sequence within said downlink transmission unit of the first type based upon a characteristic of a cell;
transmitting the downlink transmission unit; and
generating additional strip OFDM symbols, generating said strip OFDM symbol and said additional strip OFDM symbols including performing tone hopping in accordance with a second tone hopping sequence, said first and second tone hopping sequences being different and being applied independently during generation of said non-strip OFDM symbols and strip OFDM symbols, respectively, said strip OFDM symbols including said strip OFDM symbol and said additional strip OFDM symbols.

2. The communications method of claim 1,
wherein said method is implemented by a base station; and
wherein the characteristic of the cell is a cell identifier.

3. The communications method of claim 1, further comprising:
generating, a downlink transmission unit of a second type, said downlink transmission unit of a second type including a plurality of non-strip OFDM symbols but no strip OFDM symbols.

4. The communications method of claim 3, further comprising:
generating additional strip OFDM symbols; and
transmitting transmission units of the first type and transmission units of the second type according to a predetermined transmission schedule.

5. The communications method of claim 4, wherein said predetermined transmission schedule corresponds to a superslot.

6. The communications method of claim 3,
wherein first coding and modulation is performed to generate strip OFDM symbols; and
wherein second coding and modulation is performed to generate non-strip OFDM symbols, the first coding and modulation being independent of the second coding and modulation.

7. The communications method of claim 6, wherein transmission units of the first type and transmission units of the second type include the same number of non-strip OFDM symbols, each non-strip OFDM symbol including a plurality of tones.

8. The communications method of claim 7, wherein tone hopping is performed in strip OFDM symbols using a tone hopping sequence which is independent of a tone hopping sequence used to in non-strip OFDM symbols.

9. The communications method of claim 6, wherein downlink transmission units of the first type include more non-strip OFDM symbols than strip OFDM symbols.

10. The method of claim 1, wherein said strip OFDM symbol includes multiple tones.

11. The method of claim 10, where said non-strip OFDM symbols each include multiple tones.

12. The method of claim 10, wherein said data unit of the first type includes more non-strip OFDM symbols than strip OFDM symbols.

13. The method of claim 12, wherein said data unit of the first type includes only one strip OFDM symbol.

14. The method of claim 10, wherein at least some of said non-strip OFDM symbols communicate traffic data.

15. The method of claim 13, wherein said strip OFDM symbol communicates a beacon signal.

16. A communications device for generating downlink transmission units within a time division duplex (TDD) environment, comprising:
a strip symbol generator configured to generate a strip Orthogonal Frequency Division Multiplexing (OFDM) symbol;
a non-strip symbol generator configured to generate non-strip OFDM symbols using a first tone hopping sequence, tone hopping in said non-strip OFDM symbols being independent of said generation of said strip OFDM symbol;
wherein said strip symbol generator is further configured to generate additional strip OFDM symbols, said strip symbol generator being configured to perform tone hopping in accordance with a second tone hopping sequence as part of generating said strip OFDM symbol and said additional strip OFDM symbols, said first and second tone hopping sequences being different and being applied independently during generation of said non-strip OFDM symbols and strip OFDM symbols, respectively, said strip OFDM symbols including said strip OFDM symbol and said additional strip OFDM symbols, the communications e further comprising:
a downlink transmission unit generator for generating a downlink transmission unit of a first type, said downlink transmission unit of a first type including a sequence of OFDM symbols including said strip OFDM symbol and a plurality of non-strip OFDM symbols, said transmission unit generator including:
a strip symbol inserter for selectively positioning said strip OFDM symbol at an OFDM symbol location in said sequence within said downlink transmission unit of the first type based upon a characteristic of a cell; and
a transmitter for transmitting the downlink transmission unit.

17. The communications device of claim 16,
wherein said communications device is a base station.

18. The communications device of claim 16, wherein said downlink transmission unit generator is further configured to:
generate a downlink transmission unit of a second type, said downlink transmission unit of a second type including a plurality of non-strip OFDM symbols but no strip OFDM symbols.

19. The communications device of claim 18,
wherein said strip symbol generator is further configured to generate additional strip OFDM symbols; and
wherein said transmitter is further configured to transmit transmission units of the first type and transmission units of the second type according to a predetermined transmission schedule.

20. A communications device for generating downlink transmission units within a time division duplex (TDD) environment, comprising:
means for generating a strip Orthogonal Frequency Division Multiplexing (OFDM) symbol and additional strip OFDM symbols;
means for generating non-strip OFDM symbols using a first tone hopping sequence, tone hopping in said non-strip OFDM symbols being independent of said generation of said strip OFDM symbol;
wherein said means for generating a strip OFDM symbol and additional strip OFDM symbols uses tone hopping performed in accordance with a second tone hopping sequence, said first and second tone hopping sequences being different and being applied independently during generation of said non-strip OFDM symbols and strip OFDM symbols, respectively, said strip OFDM symbols including said strip OFDM symbol and said additional strip OFDM symbols, the communications device further comprising:

means for generating a downlink transmission unit of a first type, said downlink transmission unit of a first type including a sequence of OFDM symbols including said strip OFDM symbol and a plurality of non-strip OFDM symbols, said means for generating a downlink transmission unit including:
   means for selectively positioning said strip OFDM symbol at an OFDM symbol location in said sequence within said downlink transmission unit of the first type based upon a characteristic of a cell; and
means for transmitting the downlink transmission unit.

21. The communications device of claim 20, wherein said communications device is a base station.

22. The communications device of claim 20, further comprising:
   means for generating a downlink transmission unit of a second type, said downlink transmission unit of a second type including a plurality of non-strip OFDM symbols but no strip OFDM symbols.

23. A non-transitory machine readable medium having stored thereon machine-executable instructions for controlling a communications device, said communications device being abuse station, the non-transitory machine readable medium comprising:
   instructions for causing said communications device to generate strip Orthogonal Frequency Division Multiplexing (OFDM) symbols;
   instructions for causing said communications device to generate non-strip OFDM symbols using a first tone hopping sequence, tone hopping in said non-strip OFDM symbols being independent of said generation of said strip OFDM symbol;
   wherein said instructions for causing said communications device to generate strip OFDM symbols include instructions for performing tone hopping in accordance with a second tone hopping sequence as part of generating a strip OFDM symbol and additional strip OFDM symbols, said first and second tone hopping sequences being different and being applied independently during generation of said non-strip OFDM symbols and said strip OFDM symbols, respectively;
   the non-transitory machine readable medium further comprising:
   instructions for causing said communications device to generate a downlink transmission unit of a first type, said downlink transmission unit of a first type including a sequence of OFDM symbols including said strip OFDM symbol and a plurality of non-strip OFDM symbols;
   instructions for causing said communications device to selectively position said strip OFDM symbol at an OFDM symbol location in said sequence within said downlink transmission unit of the first type based upon a characteristic of a cell; and
   instructions for causing said communications device to transmit the downlink transmission unit.

24. A communications device, comprising:
a processor configured to control said communications device to:
   generate a strip Orthogonal Frequency Division Multiplexing (OFDM) symbol;
   generate non-strip OFDM symbols using a first tone hopping sequence, tone hopping in said non-strip OFDM symbols being independent of said generation of said strip OFDM symbol;
   generate a downlink transmission unit of a first type, said downlink transmission unit of a first type including a sequence of OFDM symbols including said strip OFDM symbol and a plurality of non-strip OFDM symbols;
   selectively position said strip OFDM symbol at an OFDM symbol location in said sequence within said downlink transmission unit of the first type based upon a characteristic of a cell; and
   transmit the downlink transmission unit;
wherein said processor is further configured to generate additional strip OFDM symbols and perform tone hopping in accordance with a second tone hopping sequence, as part of generating said strip OFDM symbol, said first and second tone hopping sequences being different and being applied independently during generation of said non-strip OFDM symbols and strip OFDM symbols, respectively, said strip OFDM symbols including said strip OFDM symbol and said additional strip OFDM symbols; and
wherein the communications device further comprises a memory coupled to said processor.

* * * * *